(12) United States Patent
Iida et al.

(10) Patent No.: US 8,732,149 B2
(45) Date of Patent: May 20, 2014

(54) CONTENT OUTPUT DEVICE, CONTENT OUTPUT METHOD, PROGRAM, PROGRAM RECORDING MEDIUM, AND CONTENT OUTPUT INTEGRATED CIRCUIT

(75) Inventors: Hiromi Iida, Osaka (JP); Iku Ohama, Osaka (JP); Shohji Ohtsubo, Osaka (JP)

(73) Assignee: Panasonic Corporation, Osaka (JP)

( * ) Notice: Subject to any disclaimer, the term of this patent is extended or adjusted under 35 U.S.C. 154(b) by 150 days.

(21) Appl. No.: 13/387,217

(22) PCT Filed: Jun. 3, 2011

(86) PCT No.: PCT/JP2011/003160
§ 371 (c)(1),
(2), (4) Date: Jan. 26, 2012

(87) PCT Pub. No.: WO2011/152072
PCT Pub. Date: Dec. 8, 2011

(65) Prior Publication Data
US 2012/0127066 A1    May 24, 2012

(30) Foreign Application Priority Data

Jun. 4, 2010 (JP) .................................. 2010-128589
Jul. 8, 2010 (JP) .................................. 2010-156095

(51) Int. Cl.
*G06F 7/00* (2006.01)
*G06F 17/30* (2006.01)

(52) U.S. Cl.
USPC ........................................... 707/705; 345/84

(58) Field of Classification Search
USPC ............ 345/84; 1/1; 382/306; 705/51, 14.64, 705/14.1, 14.38, 14.53; 726/4, 26, 27, 30, 726/21, 29, 3, 31, 5, 9; 713/156, 158, 171, 713/176, 400; 706/54; 710/10, 33; 711/E12.017; 718/102
See application file for complete search history.

(56) References Cited

U.S. PATENT DOCUMENTS 6,317,739 B1   11/2001   Hirata et al.
2004/0172410 A1   9/2004   Shimojima et al.
(Continued)

FOREIGN PATENT DOCUMENTS

| JP | 11-154153 | 6/1999 |
| JP | 2000-322445 | 11/2000 |
| JP | 2003-67393 | 3/2003 |
| JP | 2003-67397 | 3/2003 |

(Continued)

OTHER PUBLICATIONS

International Search Report issued Jul. 19, 2011 in corresponding International Application No. PCT/JP2011/003160.

*Primary Examiner* — Kevin M Nguyen
*Assistant Examiner* — Kenneth B Lee, Jr.
(74) *Attorney, Agent, or Firm* — Wenderoth, Lind & Ponack, L.L.P.

(57) ABSTRACT

A content output device for outputting contents to be displayed to users, including: a storage unit storing a plurality of contents, each being associated with its attribute; a first output control unit for outputting a predetermined content among the contents to a screen; a related content identifying unit for identifying, among the contents stored in the storage unit, a set of related contents whose attributes are related to an attribute of the predetermined content; a user preference identifying unit for identifying, among the contents stored in the storage unit, contents that match the preference of the user; and a second output control unit for outputting, to the screen, one or more contents that belong to both the set of related contents and the contents identified by the user preference identifying unit, thereby outputting images that are most likely to be desired by thy user.

6 Claims, 38 Drawing Sheets

(56) References Cited

U.S. PATENT DOCUMENTS

| | | |
|---|---|---|
| 2006/0047678 A1* | 3/2006 | Miyazaki et al. ............. 707/102 |
| 2006/0080342 A1* | 4/2006 | Takaki ........................ 707/100 |
| 2006/0259477 A1 | 11/2006 | Morita |
| 2008/0294607 A1* | 11/2008 | Partovi et al. ..................... 707/3 |
| 2009/0148071 A1 | 6/2009 | Ohwa et al. |
| 2011/0283234 A1 | 11/2011 | Takaki |

FOREIGN PATENT DOCUMENTS

| | | |
|---|---|---|
| JP | 2004-206679 | 7/2004 |
| JP | 2006-107260 | 4/2006 |
| JP | 2006-318033 | 11/2006 |
| JP | 2007-58562 | 3/2007 |
| JP | 2007-310610 | 11/2007 |
| JP | 2009-140452 | 6/2009 |

* cited by examiner

FIG. 2

| | | |
|---|---|---|
| 203 | File path | /abc/00123.xxx |
| 204 | Content ID | 8 |
| 205 | Type | Image |
| 206 | Creation date/time attribute | 2009/11/3 15:01 |
| 207 | Location attribute | {x6, y6} |
| 208 | Creator's name attribute | D. D. Johnson |
| 209 | Keyword attribute | Trip |

| Content ID | Type | Creation time | Location | Creator's name | Keyword |
|---|---|---|---|---|---|
| 1 | Video | 2009/8/31 8:32 | {x5, y5} | A. A. Rose | Sweets |
| 2 | Image | 2009/5/3 15:22 | {x3, y3} | - | Trip |
| 3 | Audio | 2009/11/4 10:21 | - | A. A. Rose | Sea |
| 4 | Audio | 2009/5/1 10:23 | - | BB band | Children |
| 5 | Audio | 2009/8/28 18:51 | {x9, y9} | A. A. Rose | - |
| 6 | Text | 2009/11/6 20:00 | - | A. A. Rose | - |
| 7 | Audio | 2009/5/1 9:34 | {x6, y6} | BB band | Sweets |
| 8 | Image | 2009/11/3 15:01 | {x10, y10} | D. D. Johnson | Trip |
| 9 | Image | 2009/12/20 9:11 | {x8, y8} | - | Trip |
| 10 | Video | 2009/11/6 17:30 | | - | Sweets |

FIG. 6

| Attribute type | Number | Related contents |
|---|---|---|
| Creation time | 3 | 3, 6, 10 |
| Creator's name | 0 | – |
| Location | 1 | 2 |

FIG. 8

| Attribute | Number | Contents | User high preference group |
|---|---|---|---|
| Sweets | 3 | 1, 7, 10 | ○ |
| Trip | 3 | 2, 8, 9 | ○ |
| Children | 1 | 4 | × |
| Sea | 1 | 3 | × |

FIG. 18

| | | | |
|---|---|---|---|
| 1800 | File path | | /abc/00123.xxx |
| 1803 | Content ID | | 8 |
| 1804 | Type | | Image |
| 1805 | Creation date/time attribute | | 2009/11/3 15:01 |
| 1806 | Location attribute | | {x6, y6} |
| 1807 | Facial info attribute | Number of persons | 2 |
| | | 1 — Parameter A | 0.2 |
| | | 1 — Parameter B | 0.5 |
| | | ⋮ | ⋮ |
| 1808 | | 2 — Parameter A | 0.7 |
| | | 2 — Parameter B | 0.4 |
| | | ⋮ | ⋮ |
| 1809 | Creation date/time attribute importance component | | 0.52 |
| 1810 | Location attribute importance component | | 0.3 |
| 1811 | Facial info attribute importance component | | 0.5 |

FIG. 19

| Life event name | Date/time |
|---|---|
| Birthday | 5/10 |
| Shrine visit | 1990/6/10 |
| First girl's seasonal festival | 1991/3/3 |
| 7-5-3 festival | 1994/11/15<br>1998/11/15 |
| Entrance to elementary school | 1997/4/1 |
| Entrance to junior high | 2003/4/1 |
| Coming-of-age ceremony | 2011/1/15 |
| 60th birthday | 2050/5/10 |

FIG. 20

| Location name | Location |
|---|---|
| Home | {35, 135} |
| Parent's home | {35, 139} |

FIG. 21

| Person's name | Facial info | | |
|---|---|---|---|
| | Parameter A | Parameter B | ... |
| User him/herself | 0.1 | 0.7 | ... |
| Father | 0.5 | 0.4 | ... |
| Mother | 0.5 | 0.3 | ... |

CONTENT OUTPUT DEVICE, CONTENT OUTPUT METHOD, PROGRAM, PROGRAM RECORDING MEDIUM, AND CONTENT OUTPUT INTEGRATED CIRCUIT

TECHNICAL FIELD

The present invention relates to a system for outputting contents such as images, video, audio and the like, and especially relates to a technology for retrieving and outputting contents.

BACKGROUND ART

As digital cameras, digital video cameras, HDD (Hard Disk Drive) recorders and the like have become widely used, digital contents owned by persons have increased in amount. In these circumstances, there are known content retrieval technologies for providing users with contents which the users desire to use, from among a large amount of contents. One of the content retrieval technologies is a method for attaching, to the contents, metadata that represents attributes of each content, the attributes including, for example, a content creation date/time, location, creator's name, and character string representing the substantial content of a content, and performing searching by using the metadata (see Patent Literature 1).

CITATION LIST

Patent Literature

[Patent Literature 1]
Japanese Patent Application Publication No. 2003-67397

SUMMARY OF INVENTION

Technical Problem

The above technology makes it possible to, while a user is displaying a content on a display device, retrieve contents, which are related to the displayed content, by using the metadata of the content and display the related contents.

However, according to the above conventional technology, while a user is displaying a content on a display device, related contents including such contents that are not interesting to the user are retrieved and displayed as well. This is not convenient for the user because the user has to search displayed contents including not-interesting contents, for a content that is interesting to the user.

It is therefore an object of the present invention to provide a content output device for displaying related contents that are most likely to be interesting to users.

Solution to Problem

The above object is fulfilled by a content output device comprising: a storage unit storing a plurality of contents, each of the plurality of contents being associated with an attribute thereof; a first output control unit operable to output a predetermined content among the plurality of contents stored in the storage unit to a screen; a related content identifying unit operable to identify, among the plurality of contents stored in the storage unit, a set of related contents whose attributes are related to an attribute of the predetermined content; a user preference identifying unit operable to classify the plurality of contents stored in the storage unit into a plurality of groups by attribute, calculate the number of contents belonging to each group, detect one or more groups that have the number of contents which exceeds a predetermined number, and identify a set of high-preference contents which are the contents included in the detected groups; and a second output control unit operable to output, to the screen, one or more contents that belong to both the set of related contents and the set of high-preference contents.

The above object is also fulfilled by a content output method for outputting contents to be displayed to users, comprising: a first output control step of outputting, to a screen, a predetermined content among a plurality of contents stored in a storage unit, each of the plurality of contents being associated with an attribute thereof; a related content identifying step of identifying, among the plurality of contents stored in the storage unit, a set of related contents whose attributes are related to an attribute of the predetermined content; a user preference identifying step of classifying the plurality of contents stored in the storage unit into a plurality of groups by attribute, calculating the number of contents belonging to each group, detecting one or more groups that have the number of contents which exceeds a predetermined number, and identifying a set of high-preference contents which are the contents included in the detected groups; and a second output control step of outputting, to the screen, one or more contents that belong to both the set of related contents and the set of high-preference contents.

The above object is also fulfilled by a program, described in a computer-readable format, for causing a computer to execute a processing procedure to output contents to be displayed to users, the processing procedure comprising: a first output control step of outputting, to a screen, a predetermined content among a plurality of contents stored in a storage unit, each of the plurality of contents being associated with an attribute thereof; a related content identifying step of identifying, among the plurality of contents stored in the storage unit, a set of related contents whose attributes are related to an attribute of the predetermined content; a user preference identifying step of classifying the plurality of contents stored in the storage unit into a plurality of groups by attribute, calculating the number of contents belonging to each group, detecting one or more groups that have the number of contents which exceeds a predetermined number, and identifying a set of high-preference contents which are the contents included in the detected groups; and a second output control step of outputting, to the screen, one or more contents that belong to both the set of related contents and the set of high-preference contents.

The above object is also fulfilled by a program recording medium on which is recorded a program, described in a computer-readable format, for causing a computer to execute a processing procedure to output contents to be displayed to users, the processing procedure comprising: a first output control step of outputting, to a screen, a predetermined content among a plurality of contents stored in a storage unit, each of the plurality of contents being associated with an attribute thereof; a related content identifying step of identifying, among the plurality of contents stored in the storage unit, a set of related contents whose attributes are related to an attribute of the predetermined content; a user preference identifying step of classifying the plurality of contents stored in the storage unit into a plurality of groups by attribute, calculating the number of contents belonging to each group, detecting one or more groups that have the number of contents which exceeds a predetermined number, and identifying a set of high-preference contents which are the contents included in the detected groups; and a second output control step of outputting, to the screen, one or more contents that belong to both the set of related contents and the set of high-preference contents.

The above object is also fulfilled by a content output integrated circuit for outputting contents to be displayed to users, comprising: a first output control unit operable to output a predetermined content among the plurality of contents stored in the storage unit to a screen; a related content identifying unit operable to identify, among the plurality of contents stored in the storage unit, a set of related contents whose attributes are related to an attribute of the predetermined content; a user preference identifying unit operable to classify the plurality of contents stored in the storage unit into a plurality of groups by attribute, calculate the number of contents belonging to each group, detect one or more groups that have the number of contents which exceeds a predetermined number, and identify a set of high-preference contents which are the contents included in the detected groups; and a second output control unit operable to output, to the screen, one or more contents that belong to both the set of related contents and the set of high-preference contents.

Advantageous Effects of Invention

With the above structure, the content output device of the present invention displays related contents that are most likely to be interesting to users.

The above content output device may further comprise: a user preference function generating unit operable to generate a user preference function that is used to calculate a user preference level of each content belonging to the set of high-preference contents, the second output control unit calculates the user preference level of each content belonging to the set of high-preference contents, by using the user preference function, processes the one or more contents to be highlighted in different levels in correspondence with calculated user preference levels, and then outputs the one or more contents to the screen.

With this structure, the display form of the related contents is varied depending on the preference level of the user on each related content (for example, the higher the user preference level is, the more highlighted the related image is, and the lower the user preference level is, the less highlighted the related image is). This enables the user to pay more attention to the related contents that are most likely to be interesting to users.

In the above content output device, when values of an attribute, which is common to all contents belonging to the set of high-preference contents, are represented by numerical values, the user preference function generating unit may calculate a probability density function by plotting, against the attribute represented by a horizontal axis, the values of the attribute of the contents belonging to the set of high-preference contents, and treating the plotted values of the attribute as samples that follow a normal distribution.

By using the user preference function generated in this way, it is possible to calculate a user preference level for any value of any attribute (for example, any time or any location) of a high-preference content.

BRIEF DESCRIPTION OF DRAWINGS

FIG. 2 illustrates a structure of data stored in a storage unit 1100.

FIG. 5 illustrates an example of attributes associated with images stored in the storage unit 1100.

FIG. 6 illustrates an example of results of the process performed by the related content identifying unit 1500 to identify related images.

FIG. 8 illustrates an example of results of the process performed by the user preference identifying unit 1200 to divide images into groups.

FIG. 18 shows a data structure and content example of supplementary data 1800 for each image.

FIG. 19 shows an example of life event information stored in a storage unit 3100.

FIG. 20 shows an example of frequently-appearing-location information stored in the storage unit 3100.

FIG. 21 shows an example of frequently-appearing-person information stored in the storage unit 3100.

DESCRIPTION OF EMBODIMENTS

Embodiment 1

The following describes an image display device 1000 as one embodiment of a content output device.

<Summary>

The image display device 1000 in Embodiment 1, including a storage unit storing a plurality of images, displays an image based on a user operation, searches the images stored in the storage unit for images that relate to the displayed image and match the preference of the user, and displays retrieved images to the user.

Each image stored in the storage unit is preliminarily associated with attributes of the image, the attributes including, for example, creation date/time, location, creator's name, and character string (hereinafter referred to as "keyword") indicating the substantial content of the image. The image display device retrieves images related to an image displayed by a user operation, by extracting images whose attributes are related to an attribute of the displayed image (hereinafter, images related to an image displayed by a user operation are referred to as "related images").

Also, the image display device retrieves images, from among the images stored in the storage unit, that match the preference of the user by classifying the images into groups by attribute, counting the number of images for each group, and extracting images from each group including images the number of which exceeds a reference number. This is based on a general assumption that a larger number of images owned by the user with regard to an attribute than the other attributes is more important to the user. Thus, by extracting such images, images expected to match the preference of the user can be extracted.

The image display device displays, on the display device, images that belong to both the set of related images and the set of images that are assumed to match the preference of the user.

For example, suppose that a keyword attribute that represents the substantial content of the image is used in the process for identifying images that match the preference of the user. In that case, if the user owns, for example, a lot of images associated with a keyword "trip", images having the keyword "trip", among the related images, are displayed. In the case of this example, images in which the user is likely to be interested are displayed, since it is expected that going to a trip is important to the user.

<Structure>

The following describes the structure of the image display device 1000.

The image display device 1000 is explained with reference to the structure diagram of FIG. 1.

Figure 1:
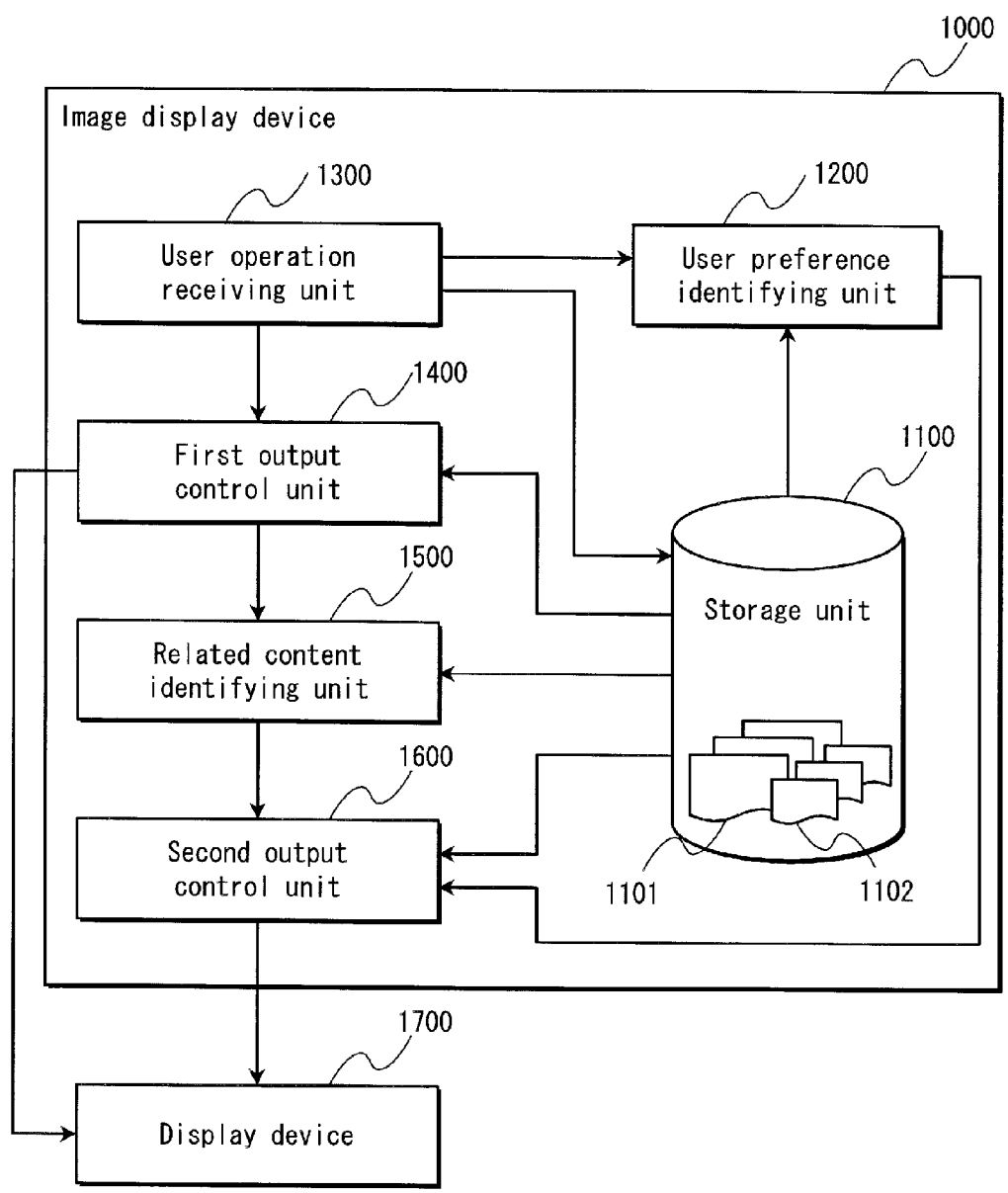
FIG. 1 is a structure diagram of an image display device 1000 in Embodiment 1.

As shown in FIG. 1, the image display device 1000 includes a storage unit 1100, a user preference identifying unit 1200, a user operation receiving unit 1300, a first output control unit 1400, a related content identifying unit 1500, and a second output control unit 1600. The image display device 1000 is also connected with, as an external output device, a display device 1700 which is a display or the like for displaying images.

The storage unit 1100 is structured from an HDD (Hard Disk Drive), a memory or the like, and stores images 1101 and attributes 1102 in association with each other. For example, the storage unit 1100 receives image data of images photographed by the user from a digital camera, and stores the images in association with the attributes.

The user preference identifying unit 1200, user operation receiving unit 1300, first output control unit 1400, related content identifying unit 1500, and second output control unit 1600 are structured from a processor and a memory, and each function thereof is realized as the processor executes a control program stored in the memory. The user operation receiving unit 1300 further includes a pointing device or the like for receiving a user operation.

The user preference identifying unit 1200 has a function to, upon receiving from the user operation receiving unit 1300 a notification that an image was stored into the storage unit 1100, refer to the attributes of the images stored in the storage unit 1100, divide the images into groups by keyword attribute, identify groups that each include images the number of which exceeds a reference number (hereinafter such groups are referred to as "user high preference groups"), and notify the second output control unit 1600 of images included in the user high preference groups (hereinafter such images are referred to as "user high preference images").

The user operation receiving unit 1300 has the following functions: a function to, upon receiving an image input from the user, store the input image into the storage unit 1100 in association with the attribute, and notify the user preference identifying unit 1200 that an image was stored into the storage unit 1100; a function to, upon receiving a user operation to display images, send an image display instruction to the first output control unit 1400; and a function to, upon receiving a user operation to select one among images output to the display device 1700, send an image selection instruction to the first output control unit 1400. Here, the image display instruction is an instruction to generate a plurality of reduced images (thumbnail images) of the images stored in the storage unit 1100 and display the reduced images on the display device 1700. Also, the image selection instruction is an instruction to retrieve a selected image from the storage unit 1100 and display the selected image on the display device 1700 and instruct the related content identifying unit 1500 to identify the related images.

The first output control unit 1400 has a function to receive two types of instructions one at a time from the user operation receiving unit 1300 and execute the received instruction. Upon receiving the image display instruction, the first output control unit 1400 obtains from the storage unit 1100 a plurality of images to be displayed, generates thumbnail images of the images, outputs the thumbnail images to the external display device 1700, and causes the display device 1700 to display the thumbnail images. Upon receiving the image selection instruction, the first output control unit 1400 obtains from the storage unit 1100 an image selected by the user, outputs the selected image to the external display device 1700, causes the display device 1700 to display the selected image, and instructs the related content identifying unit 1500 to identify images related to the user-selected image.

The related content identifying unit 1500 has a function to, upon receiving from the first output control unit 1400 an instruction to identify images related to the user-selected image, perform the following. That is to say, the related content identifying unit 1500 refers to the attributes of the images stored in the storage unit 1100, identifies, as related images, images that have a predetermined relationship with the user-selected image, for each of three attributes: the creation date/time attribute; the creator's name attribute; and the location attribute, and notifies the second output control unit 1600 of the related images. The predetermined relationship will be described later.

The second output control unit 1600 has a function to receive a notification of a set of user high preference images from the user preference identifying unit 1200 and a notification of a set of related images from the related content identifying process, identify, as recommended images, images that belong to both sets, obtain the recommended images from the storage unit 1100, output the recommended images to the external display device 1700, and cause the display device 1700 to display the recommended images.

The display device 1700 has a function to, upon receiving an output of images from the first output control unit 1400 or an output of recommended images from the second output control unit 1600, display the images on a display or the like.

<Data Structure>

The following describes the structure of the data dealt with by the image display device 1000 having the above structure.

The storage unit 1100 stores a plurality of images and attributes corresponding to the images, in association with each other. Note that, in the present document, the images refer to still image data (JPEG (Joint Photographic Experts Group) data or the like) of photographs taken by a digital camera or the like.

FIG. 2 illustrates an example of a data structure table 200 that is associated with each image stored in the storage unit 1100. The table 200 is composed of a data type column 201 and a column 202 that contains actual data, and includes a plurality of elements. The following explains each element provided in the example of FIG. 2. The element "file path" indicates an address where the image is stored. The element "content ID" indicates a number that uniquely identifies the image stored in the address indicated by the "file path". The element "type" indicate the type of the file stored in the address indicated by the "file path". In Embodiment 1, all the files are an "image" type. The element "creation date/time attribute" is an attribute that indicates the date/time at which the image stored in the address indicated by the "file path" was created. The element "location attribute" is an attribute that indicates the location at which the image was created. The element "creator's name attribute" is an attribute that indicates the name of the creator of the image. The element "keyword attribute" is an attribute that indicates the substantial content of the image.

In the element 203 "file path" of the table 200, a character string indicating the address of the image is input by the image display device. The example of FIG. 2 indicates that the image is a file "00123.xxx" in a folder "abc" stored in the storage unit 1100.

The element 204 "content ID" contains a numerical value that is assigned by the image display device to the image when the image is stored into the storage unit 1100, wherein a unique numerical value is assigned to each image, namely, each content. The example of FIG. 2 indicates that the content ID that uniquely identifies the image at "abc/00123.xxx" is "8".

In the example of FIG. 2, the element 205 "type" contains "image". This indicates that the file "/abc/00123.xxx" is still image data.

The element 206 "creation date/time attribute" indicates the year, month, day, and time in the format "year/month/day time" by using numerical values. These data had been attached to the image by a device that created the image when the image was created. The example of FIG. 2 indicates that the image was created at 15:01 on Nov. 3, 2009.

The element 207 "location attribute" in the table indicates, in the format "[latitude, longitude]", the latitude and longitude of a location at which the image was created. These data may, or may not, be attached to the file depending on the specification of the device that created the file. The example of FIG. 2 indicates that the image was created at a location of latitude x6 and longitude y6.

The element 208 "creator's name attribute" in the table may, or may not, be given depending on the specification of the device that created the image. The "creator's name attribute" is not necessarily given. As a result, it may be input by the user by using the image display device. The example of FIG. 2 indicates that the image was created by D. D. Johnson.

The element 209 "keyword attribute" in the table may, or may not, be given depending on the specification of the device that created the image. The "keyword attribute" is not necessarily given. As a result, it may be input by the user by using the image display device. The example of FIG. 2 indicates that the image is related to a trip.

Since the "location", "creator's name", and "keyword" attributes are not necessarily given, there may not be the data thereof.

<Operation>

The following describes the operation of the image display device 1000 having the above structure and data structure.

Figure 3:
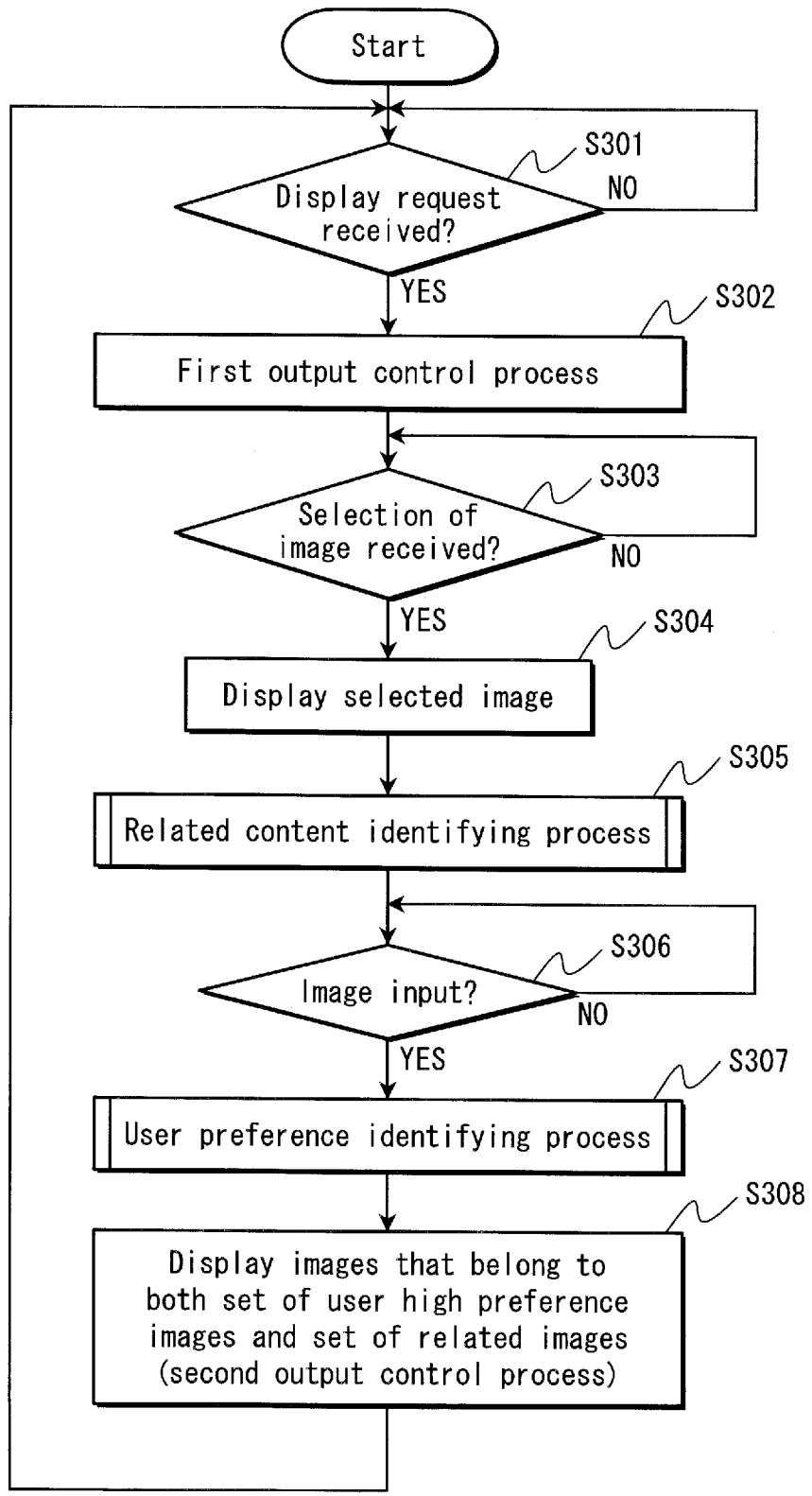
FIG. 3 is a flowchart of a process performed by the image display device 1000.

FIG. 3 is a flowchart of the display process performed by the image display device 1000.

First, the user operation receiving unit 1300 receives an image display request from the user (step S301). If no display request is made by the user (NO in step S301), the control returns to step S301. If an image display request is received from the user (YES in step S301), the first output control unit 1400 reads a plurality of images from the storage unit 1100, generates and outputs thumbnail images to the display device 1700 and displays the thumbnail images on the display device 1700 (step S302). Note that, in the present application document, this display process may be referred to as "first output control process". Subsequently, a selection of an image interested by the user to be viewed is awaited (step S303). If no image is selected (NO in step S303), the step is in the wait state until an image is selected. If an image is selected (YES in step S303), the first output control unit 1400 displays the selected image (step S304), and the related content identifying unit 1500 performs the related content identifying process (step S305).

Figure 4:
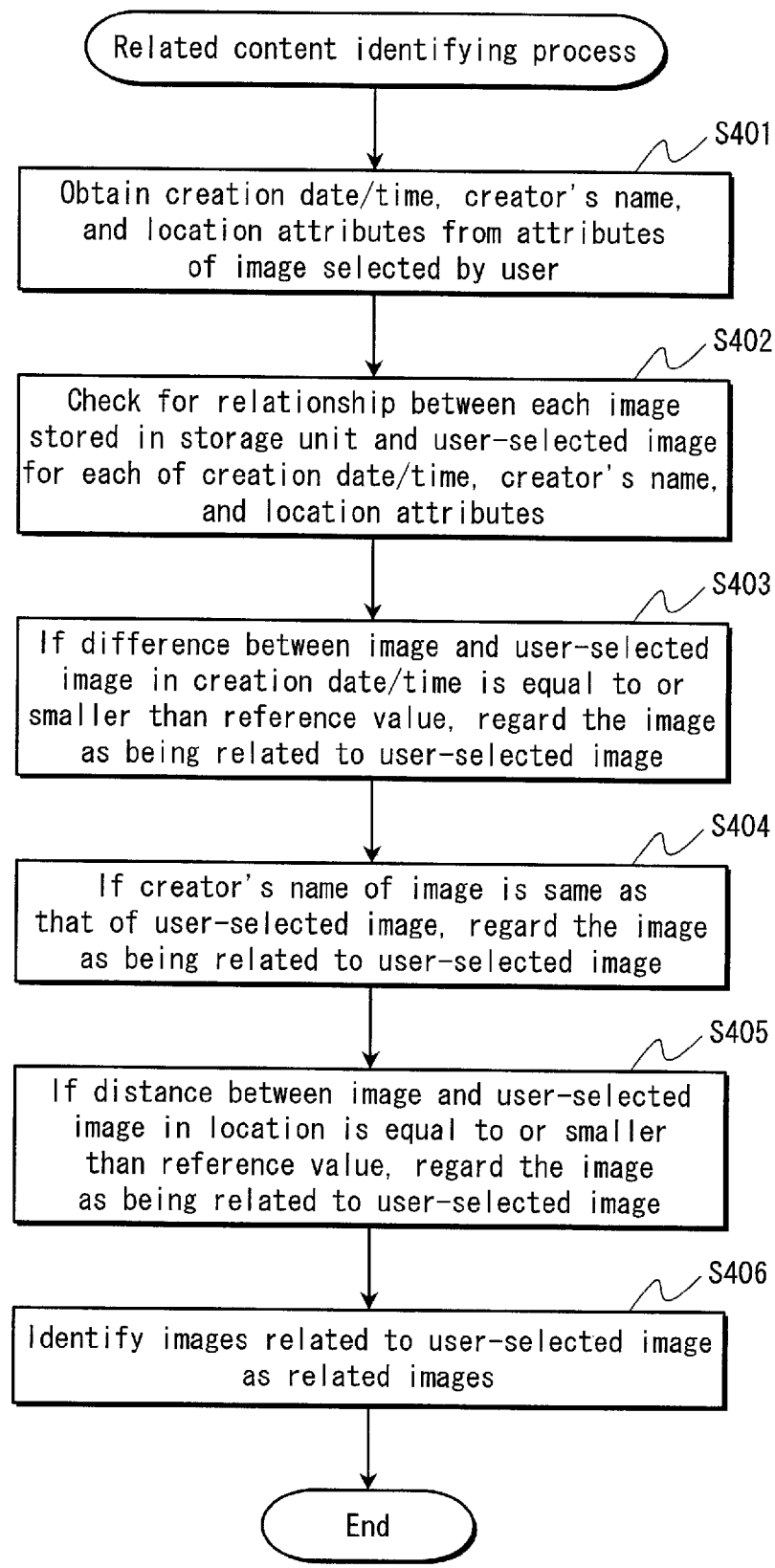
FIG. 4 is a flowchart of a process performed by a related content identifying unit 1500.

The following describes the related content identifying process in detail with reference to FIG. 4.

FIG. 4 is a flowchart of the related content identifying process performed by the related content identifying unit 1500 in step S305. The related content identifying unit 1500 first obtains the creation date/time attribute; creator's name attribute; and location attribute from the attributes of the image selected by the user (step S401). Next, the related content identifying unit 1500 checks for the relationship between each image stored in the storage unit 1100 and the user-selected image with regard to each of the creation date/time attribute, creator's name attribute, and location attribute (step S402). With regard to the creation date/time attribute, if a difference between an image and the user-selected image in creation date/time is equal to or smaller than a reference value, the related content identifying unit 1500 regards the image as being related to the user-selected image (step S403). With regard to the creator's name attribute, if the creator's name of an image is the same as that of the user-selected image, the related content identifying unit 1500 regards the image as being related to the user-selected image (step S404). With regard to the location attribute, if a distance between an image and the user-selected image in location is equal to or smaller than a reference value, the related content identifying unit 1500 regards the image as being related to the user-selected image (step S405). The identification of related images having attributes having a predetermined relationship with the user-selected image performed by the related content identifying unit 1500 with the above structure is realized by the related content identifying unit 1500 executing the processes in steps S403 through S405. Note that the processes in steps S403 through S405 may be executed in any order, or alternatively may be processed in parallel with each other. Lastly, the related content identifying unit 1500 identifies images related to the user-selected image with regard to each of the creation date/time attribute, creator's name attribute, and location attribute (step S406).

For example, the related content identifying process is performed with reference to the table shown in FIG. 5. In FIG. 5, data with content ID "11" or more are omitted. Here, one example of the process performed by the related content identifying unit 1500 for the images having content IDs 1 through 10 is explained. In the representation of the elements of the table, the sign "-" indicates that there is no attribute, and the element with the sign "-" is excluded from the targets of the related content identifying process. Suppose that the user has selected an image whose content ID is "8". Suppose also that the user has selected, as the attribute of this image, the "creation date/time" attribute. Further suppose that the reference value for the attribute is "four days from the creation date/time", then, since the "creation date/time" attribute of the image of content ID "8" is "2009/11/3 15:01", the range of values of the attribute that renders an image related to this image is "four days from 2009/11/3 15:01". As a result of searching for images having values of the attribute in this range, images with content IDs "3", "6" and "10" are identified as being related to the image. Thus, the images of content IDs "3", "6" and "10" are determined as the images related to the image of content ID "8". Similarly, the process with regard to the "creator's name" attribute is described. Among the images of content IDs "1" through "10", only the image of content ID "8" has an attribute value "D. D. Johnson", and thus it is determined that there is no image related to the image of content ID "8" with regard to the "creator's name" attribute. Similarly, the process with regard to the "location" attribute is described. Suppose that the reference value is "within the radius of 10 km from the point", then, since the "location" attribute of the image of content ID "8" is {x6, y6} (latitude x6, longitude y6), the range of values of the attribute that renders an image related to this image is "within the radius of 10 km from point {x6, y6}". If, as a result of searching for images within this range, only image with content ID "2" is identified as being related to the image, only image with content ID "2" is identified as being related to the image. In this way, for each of the creation date/time attribute, creator's name attribute, and location attributes, images related to the image of content ID "8" are identified (step S406). FIG. 6 illustrates a table showing the results of the above process. This table indicates that the images related to the image of content ID "8" are images with content IDs "2", "3", "6" and "10".

This completes the explanation of the related content identifying process with reference to FIG. 4, and returns back to step S306 in FIG. 3.

Subsequently, the user operation receiving unit 1300 checks on whether or not an image has been input, by checking on whether or not an input signal has been input from an external storage unit (a flash memory, an SD (Secure Digital) card or the like) into an internal storage unit 1100 (step S306). If no image has been input by the user (NO in step S306), an input of an image from the user is awaited. If an image has been input by the user (YES in step S306), the user preference identifying unit 1200 performs a user preference identifying process (step S307).

Figure 7:
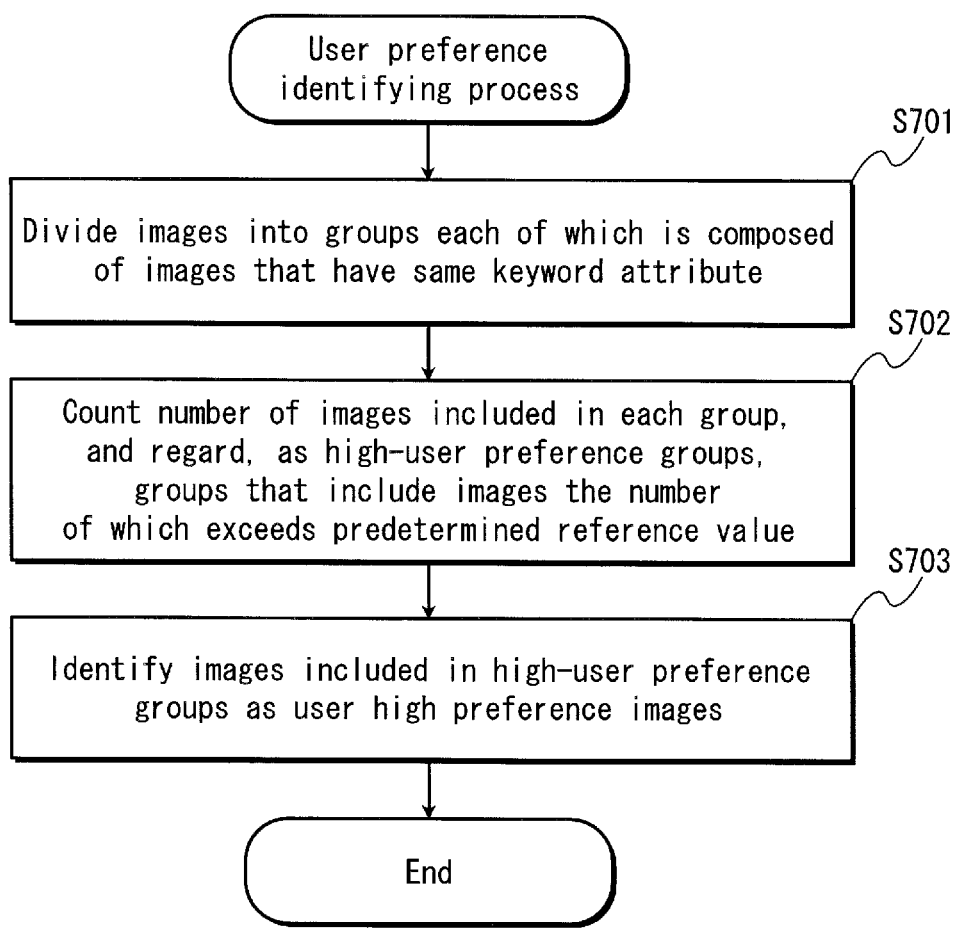
FIG. 7 is a flowchart of a process performed by a user preference identifying unit 1200.

The following describes the user preference identifying process in detail with reference to FIG. 7.

FIG. 7 is a flowchart of the user preference identifying process performed by the user preference identifying unit 1200 in step S307. The user preference identifying unit 1200 divides all images stored in the storage unit 1100 into groups. The grouping is made by keyword attribute. First, the user preference identifying unit 1200 divides the images into groups each of which is composed of images that have the same keyword attribute (step S701). The user preference identifying unit 1200 then counts the number of images included in each group, and regards, as user high preference groups, groups that include images the number of which exceeds a predetermined reference value (step S702). Lastly, the user preference identifying unit 1200 identifies, as user high preference images, the images included in the user high preference groups (step S703).

For example, a table indicating the data recorded on the storage unit 1100 is shown in FIG. 5. In FIG. 5, data with content ID "11" or more are omitted. Here, one example of the process performed by the user preference identifying unit 1200 for the images having content IDs 1 through 10 is explained. First, the user preference identifying unit 1200 divides the images into groups by keyword attribute (step S701). For example, three images with IDs "1", "7" and "10" belong to a group of keyword attribute "sweets". Similarly, three images with IDs "2", "8" and "9" belong to a group of keyword attribute "trip". Also, an image with ID "3" belongs to a group of keyword attribute "sea", and an image with ID "4" belongs to a group of keyword attribute "children". In the representation of the elements of the table, the sign "-" indicates that there is no attribute, and the element with the sign "-" is excluded from the targets of the related content identifying process. FIG. 8 illustrates a table showing the results of the above process. The user preference identifying unit 1200 then regards, as user high preference groups, groups that include images the number of which exceeds a predetermined reference value (step S702). In this example, the reference value is set to "3", and thus, as indicated in FIG. 8, the groups with keywords "sweets" and "trip" are regarded as user high preference groups. Lastly, the user preference identifying unit 1200 identifies, as user high preference images, the images included in the user high preference groups (step S703). In this example, from FIG. 8, six images with IDs "1", "2", "7", "8", "9" and "10" are identified as user high preference images.

This completes the explanation of the user preference identifying process with reference to FIG. 7, and returns back to step S308 in FIG. 3.

After the user preference identifying process (step S307 in FIG. 3) shown in FIG. 7, the second output control unit 1600 identifies, as recommended images, the images that belong to both of a set of user high preference images and a set of related images, displays the recommended images together with the user-selected image (step S308), and returns to step S301. In the present application document, the processes of identifying and displaying recommended images performed by the second output control unit 1600 may be referred to as a second output control process.

Figure 9:
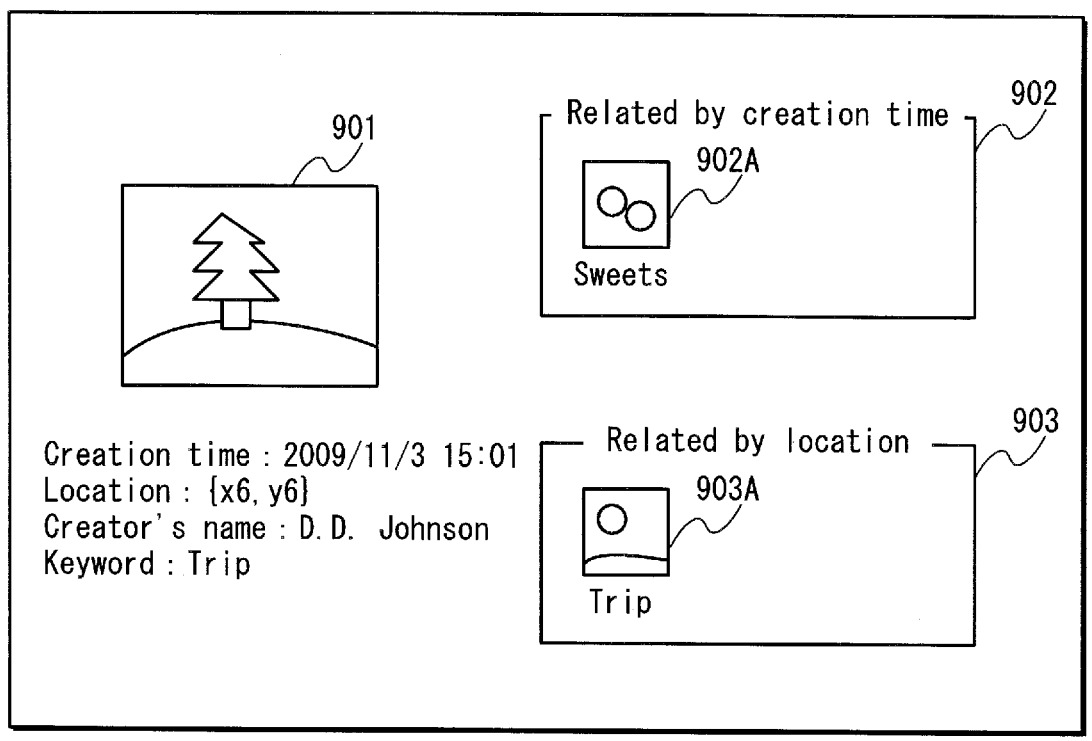
FIG. 9 illustrates an example of output results by the image display device 1000.

Here, one example of the process is considered in the case of images having content IDs 1 through 10 among the image list shown in FIG. 5. In this example, the user high preference images are images having IDs "1", "2", "7", "8", "9" and "10", and the related images are images having IDs "2", "3", "6" and "10" when the user-selected image is an image having ID "8". In this case, the images that belong to both of the sets are images having IDs "2" and "10". These images are identified as recommended images and are displayed on the display device 1700. FIG. 9 illustrates an example of display. An area 901 is provided to display the user-selected image, which is, in this example, the image with content ID "8". Also, an area 902 is provided to display an image that is related to the user-selected image with regard to the "creation date/time" attribute. In the area 902, an icon (902A in FIG. 9) representing an image with content ID "10", which is a an image that is related to the user-selected image with regard to the "creation date/time" attribute and is a user high preference image, is displayed together with a keyword attribute "sweets". Furthermore, an area 903 is provided to display an image that is related to the user-selected image with regard to the "location" attribute. In the area 903, an icon (903A in FIG. 9) indicating an image with content ID "2", which is an image that is related to the user-selected image with regard to the "location" attribute and is a user high preference image, is displayed together with a keyword attribute "trip" (step S307).

When the user performs an operation to select the recommended images 902A and 903A in FIG. 9, the selected images are displayed in the area 901 in FIG. 9, and through similar operations to those shown in FIG. 3, the recommended images are displayed.

Embodiment 2

The following describes an image display device 2000 as one embodiment of a content output device.

<Summary>

Figure 10:
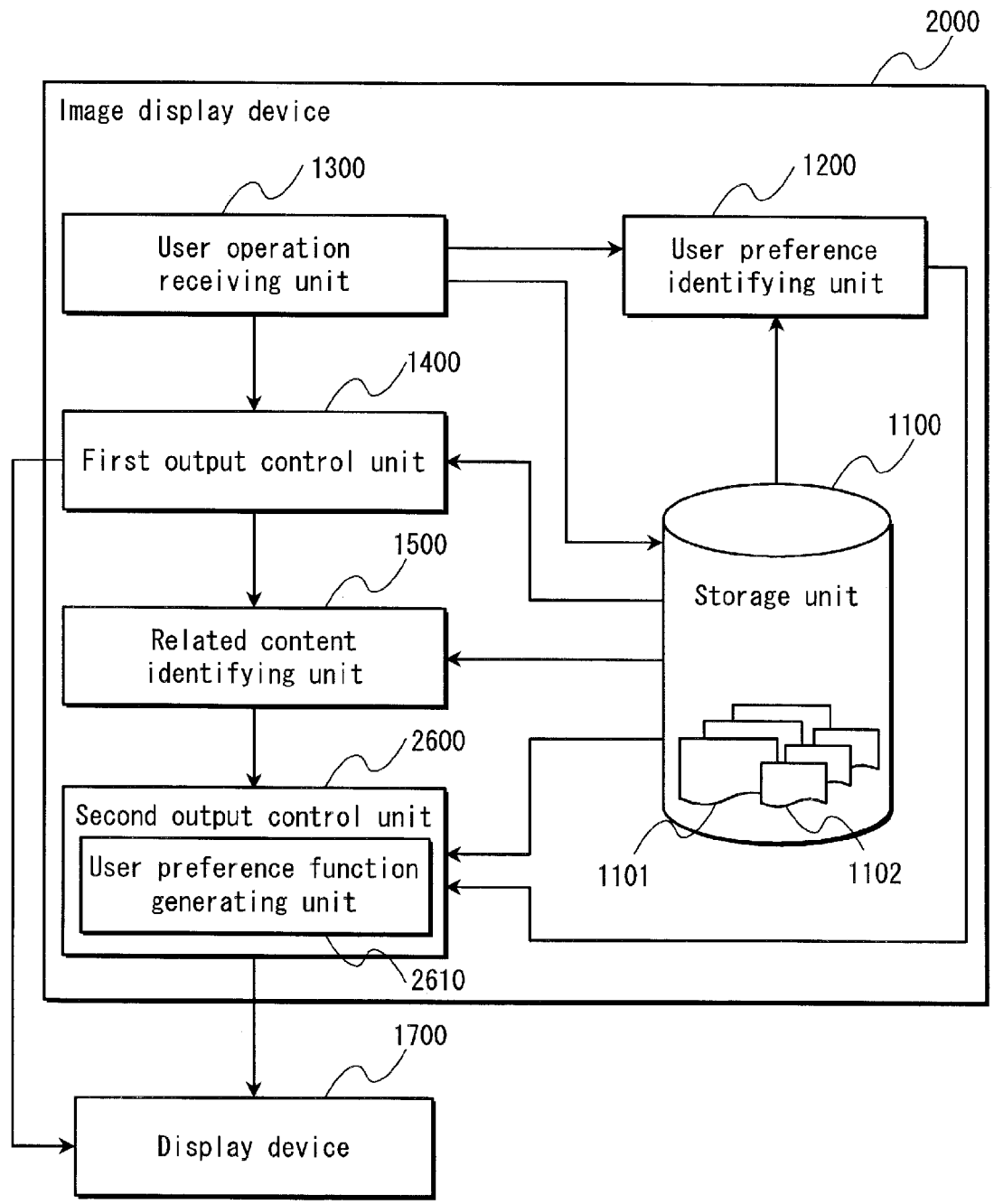
FIG. 10 illustrates a structure of an image display device 2000 in Embodiment 2.

FIG. 10 illustrates the structure of the image display device 2000 in Embodiment 2.

The image display device 2000 is different from the image display device 1000 in Embodiment 1 in that it includes a structural element for calculating a user preference level based on the attributes of the user high preference images.

That is to say, as shown in FIG. 10, instead of the second output control unit 1600, a second output control unit 2600 is included in the image display device 1000 described in Embodiment 1, the second output control unit 2600 having a function to calculate the user preference level. With this structure, the user preference level is calculated and the output reflects the user preference level before a recommended image is displayed, the user preference level indicating a level of the preference of the user.

<Structure and Data Structure>

The following describes the structure of the image display device 2000.

The structure of the image display device 2000 is described with reference to FIG. 10. As shown in FIG. 10, the image display device 2000 includes the storage unit 1100, user preference identifying unit 1200, user operation receiving unit 1300, first output control unit 1400, related content identifying unit 1500, and second output control unit 2600, which are the same as those of the image display device described in Embodiment 1. Here, description of the structural elements that are the same as those of the image display device 1000 is omitted.

The second output control unit 2600 is structured from a processor and a memory, and the following functions thereof are realized as the processor executes a control program stored in the memory.

The second output control unit 2600 has a function to receive a notification of a set of user high preference images from the user preference identifying unit 1200 and a notification of a set of related images from the related content identifying process, identify, as recommended images, images that belong to both sets, obtain the recommended images from the storage unit 1100, calculate the user preference level by using the attributes of the user-selected image and the attributes of the images identified by the user preference identifying unit 1200, output the user preference level together with the recommended images to the external display device 1700, and cause the display device 1700 to display the user preference level and the recommended images. A user preference level calculation method will be described later. The second output control unit 2600 includes a user preference function generating unit 2610. The user preference function generating unit 2610 generates a user preference function that is used to calculate the user preference level. Details of generation of the user preference function will be described later. In the present embodiment, the user preference function generating unit 2610 is included in the second output control unit 2600. However, the user preference function generating unit 2610 is not necessarily included in the second output control unit 2600 as far as it is included in the image display device 2000. In that case, the user preference function generating unit 2610 may output the generated user preference function to the second output control unit 2600.

Here, the following describes the data structure of the storage unit 1100 that is dealt with by the image display device 2000 having the above structure. The structure of the data dealt with by the image display device 2000 is the same as the structure of the data dealt with by the image display device of Embodiment 1. Thus the description thereof is omitted.

<Operation>

The following describes the operation of the image display device 2000 having the above structure and data structure.

Figure 11:
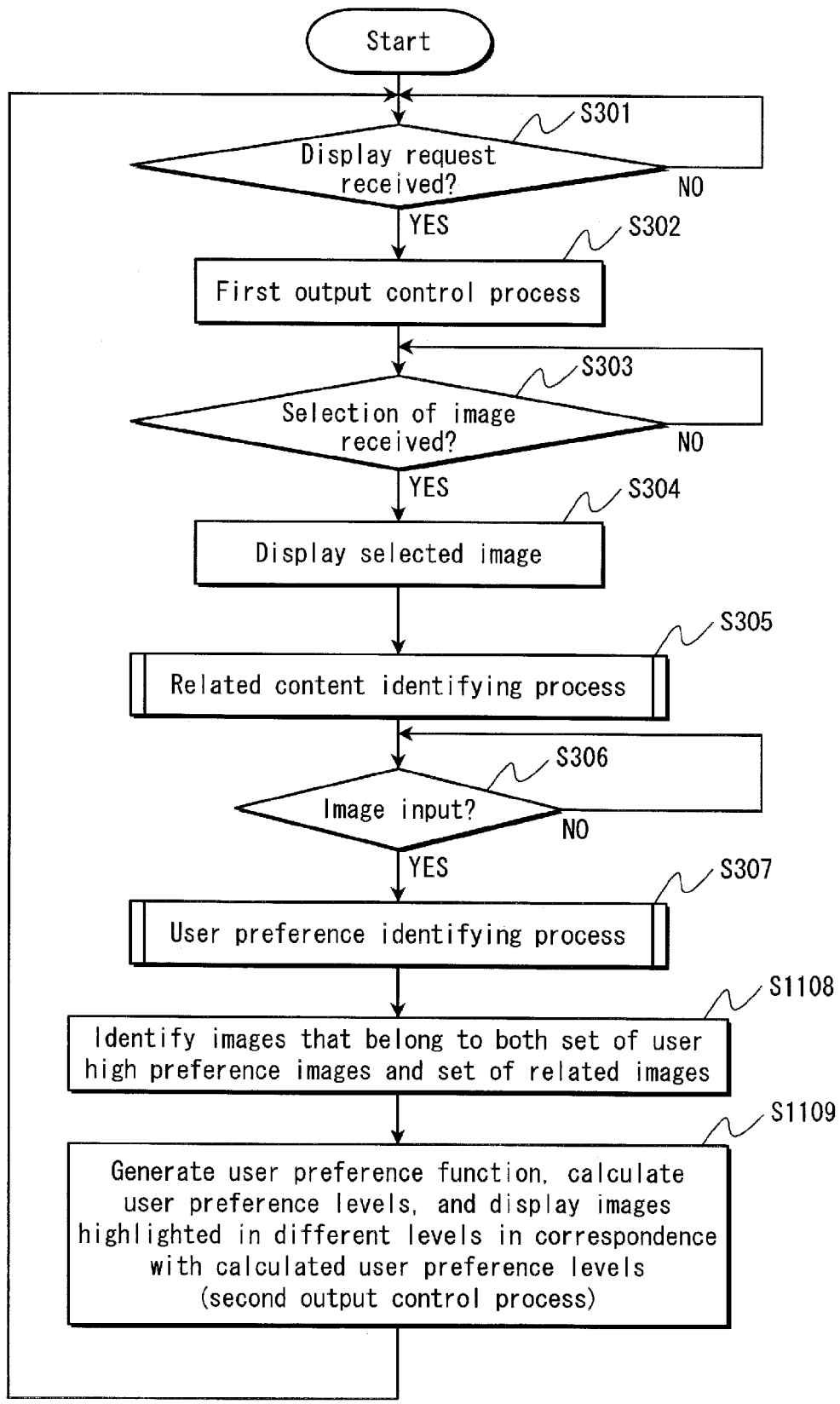
FIG. 11 is a flowchart of a process performed by the image display device 2000.

FIG. 11 is a flowchart showing the operation of the image display device 2000. Note that the description of the same processes as those of the flowchart shown in FIG. 3 in Embodiment 1, which are identified by the same reference signs, is omitted here.

The image display device 2000 causes the second output control unit 2600 to identify, as recommended images, images that belong to both the related images and the user high preference images (step S1108). Next, the second output control unit 2600 determines the display content by using the user preference level that is calculated by using the attributes of the user-selected image and the attributes of the images identified by the user preference identifying unit 1200, outputs the display content to the display device 1700 and causes the display device 1700 to display the display content (step S1109). Note that in FIG. 11, step S1109 includes the recitation "second output control process". However, strictly speaking, steps S1108 and S1109 constitute the second output control process.

Figure 12:
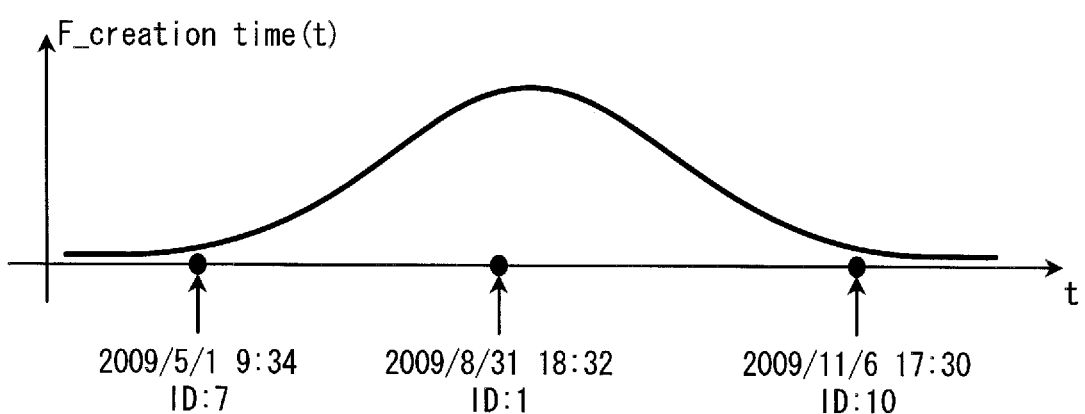
FIG. 12 illustrates a concept of user preference levels calculated by the second output control unit 2600 based on the "creation date/time" attribute of the image display device 2000.

The following describes a case where the process proceeds in the same manner up to step S307 in FIG. 11 as the example provided in Embodiment 1. In this case, from FIG. 8, it is recognized that the user high preference groups are image groups having attributes "sweets" and "trip". Also, when the images and attributes listed in FIG. 5 are stored in the storage unit 1100, attributes "creation date/time" and "location" are represented by numerical values. Here, the user preference function generating unit 2610 creates a user preference function whose variable is the "creation date/time" attribute of the images with contents ID=1, 7, 10 that belong to the user high preference group of "sweets", as follows. As shown in FIG. 12, the user preference function generating unit 2610 plots, against the creation date/time represented by the axis t, values of the "creation date/time" attribute of the images with contents ID=1, 7, 10, and calculates a probability density function of a normal distribution by treating the plotted values of the attribute as samples. The probability density function is used as a user preference function "F_creation date/time (t)" whose variable is the creation date/time "t" of the user high preference group of "sweets".

Figure 13:
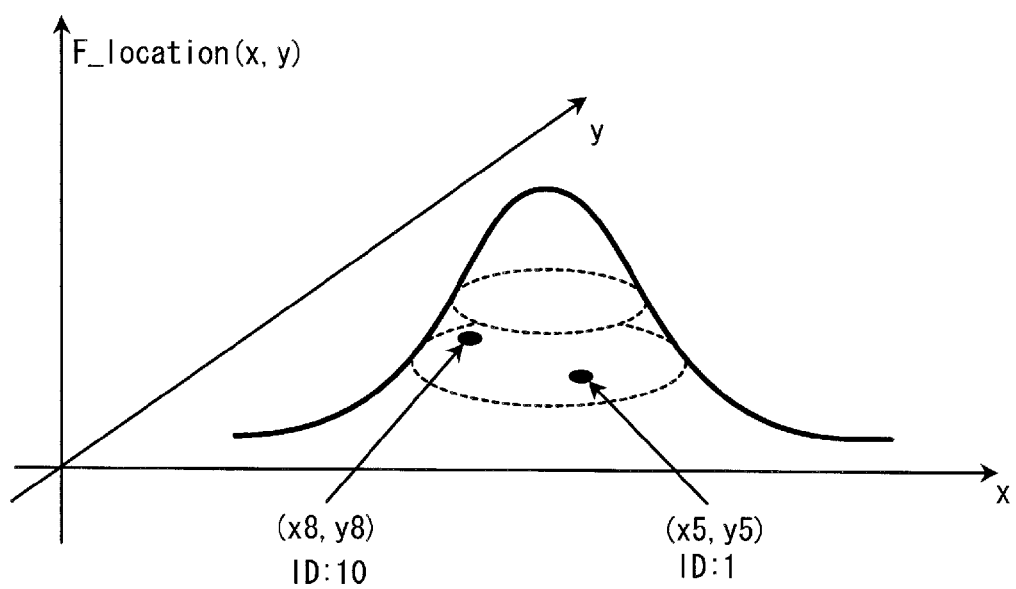
FIG. 13 illustrates a concept of user preference levels calculated by the second output control unit 2600 based on the "location" attribute of the image display device 2000.

Also, the user preference function generating unit 2610 creates a user preference function whose variable is the "location" attribute of the user high preference group of "sweets", as follows. As shown in FIG. 13, the user preference function generating unit 2610 plots, against the coordinates of latitude x and longitude y, the values of the "location" attribute of the images with contents ID=1, 10 (disregarding the image with content ID=7 that does not have the "location" attribute), and calculates a probability density function of a normal distribution by treating the plotted values of the attribute as samples following the two-dimensional normal distribution. The probability density function is used as a user preference function "F_location (x, y)" whose variable is the location $\{x, y\}$ of the user high preference group of "sweets".

Similar processes for creating the functions are performed for "trip", as well.

Next, the second output control unit 2600 calculates user preference levels of the user high preference groups by assigning the values of attributes of the user-selected image to the user preference functions related to the user high preference groups. More specifically, if the content ID of the user-selected image is 8, the user preference level for the "creation date/time" attribute of the user high preference group of "sweets" is "0.2", which is obtained by assigning the "creation date/time" attribute "2009/11/3 15:01" of the image with content ID=8 to "t" in the user preference function "F_creation date/time (t)" whose variable is the "creation date/time" t of the user high preference group of "sweets". Also, the user preference level for the "location" attribute of the user high preference group of "trip" is "0.5", which is obtained by assigning the "location" attribute "latitude x6, longitude y6" of the image with content ID=8 to x and y in the user preference function "F_location (x, y)" whose variable is the "location" $\{x, y\}$ of the user high preference group of "trip".

Lastly, the second output control unit 2600 displays, based on the user preference levels, the images that are related images and user high preference images. For example, as shown in FIG. 14, an area (1401) is provided to display an image that is related to the user-selected image with regard to the "creation date/time" attribute, an area (1402) is provided to display an image that is related to the user-selected image with regard to the "location" attribute, and as in Embodiment 1, images, which are related to the user-selected image with regard to the "creation date/time" and "location" and are user high preference images, are displayed in these areas, respectively, in descending order of user preference level.

Figure 14:
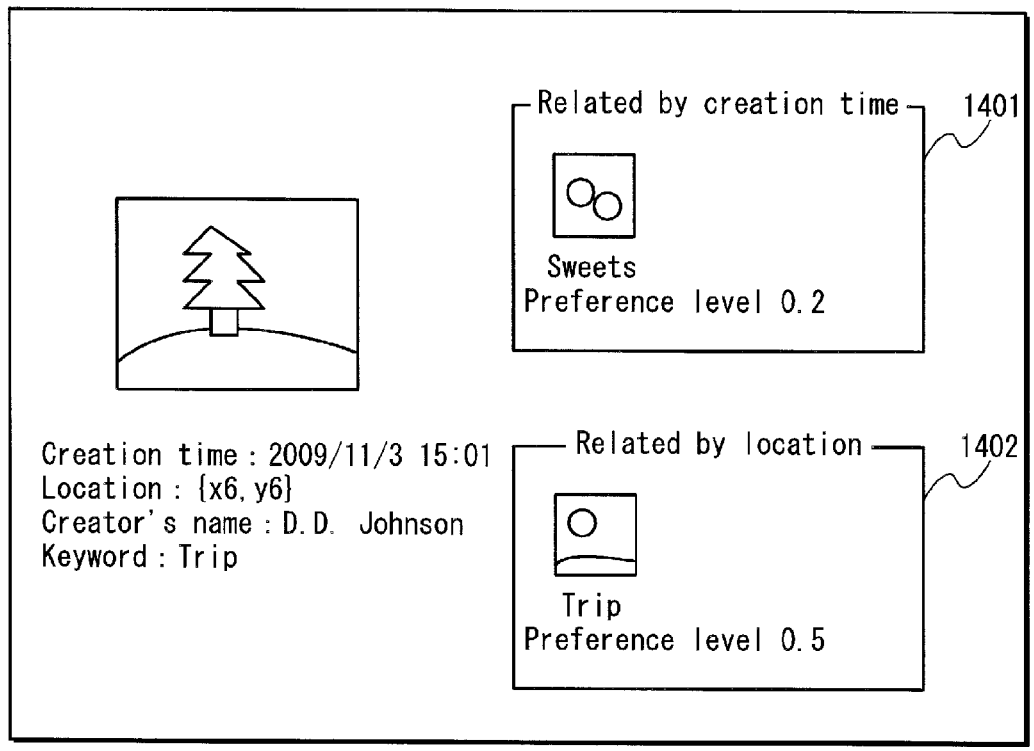
FIG. 14 illustrates an example of output results by the image display device 2000.

In FIG. 14, when the user performs an operation to select a recommended image, the selected image is displayed in the left area in FIG. 14, and through similar operations to those shown in FIG. 11, the recommended image is displayed together with the user preference level. Here, the second output control unit 2600 may output the recommended images by varying the display form in accordance with the user preference level. For example, the second output control unit 2600 may output the recommended images by varying the display form such that the higher the user preference level is, the more highlighted the recommended image is (for example, the higher the user preference level is, the larger the recommended image is), and the lower the user preference level is, the less highlighted the recommended image is (for example, the lower the user preference level is, the smaller the recommended image is). How to vary the display form in accordance with the user preference level is described in detail in Embodiments 3 and 4.

Embodiment 3

Embodiment 3 describes details of outputting the contents by the second output control unit by varying the display form described in Embodiment 2. The following describes an image display device 3000 in Embodiment 3.

<Summary>

The image display device 3000 in Embodiment 3 includes a storage unit 3100 storing a plurality of images, and supports the user to retrieve an image by displaying a plurality of images based on a user operation, with the same size, in an order of creation date/time, and varying the grayscale level of the displayed images in accordance with a user operation.

Each image stored in the storage unit 3100 is preliminarily associated with the attributes of the image, namely, the creation date/time attribute, location attribute, and facial information attribute of persons included in the image. The image display device 3000 calculates, for each attribute, importance components constituting the importance level, and as the user specifies an attribute by using a slide bar that is a user interface on the screen, obtains, as the importance level of the image, a sum of products of multiplying the weight coefficient, which represents the weight of the attribute, by the importance components.

The importance level of each image is classified into N levels (in this example, three levels), and the image display device 3000 performs a control such that each image is displayed in a different display form for each different classification result. That is to say, the image display device 3000 performs a control such that the images are displayed in the same size, the higher the importance level is, the denser the displayed image is, and the lower the importance level is, the paler the displayed image is. Also, as the arrangement of the displayed images, the image display device 3000 performs a control such that the images are arranged in an order of the date/time indicated by the creation date/time attribute. This facilitates the user to search for an image.

<Structure>

Figure 17:
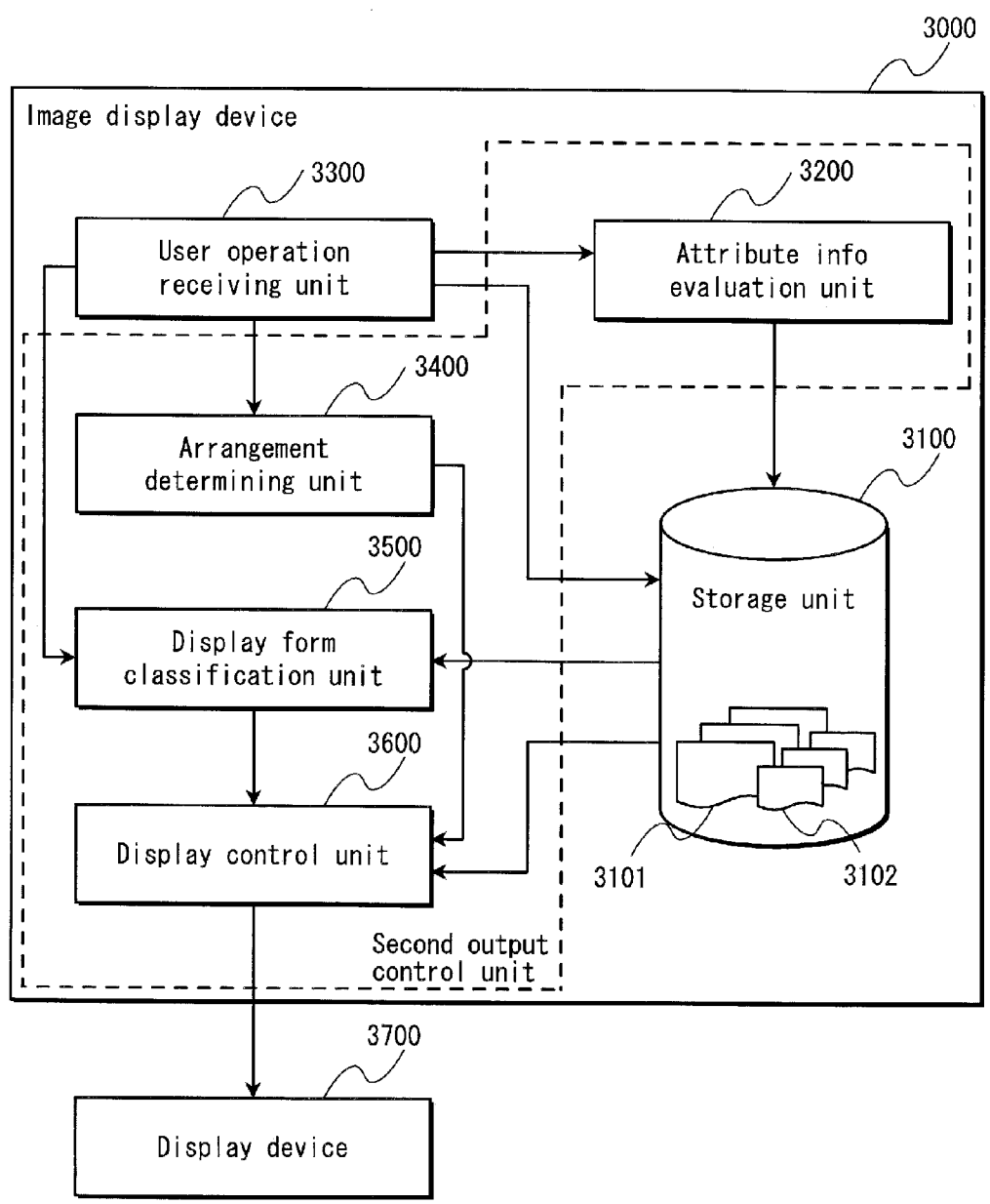
FIG. 17 illustrates a structure of an image display device 3000 in Embodiment 3.

The following describes the structure of the image display device 3000 with reference to FIG. 17.

As shown in FIG. 17, the image display device 3000 includes a storage unit 3100, an attribute information evaluation unit 3200, a user operation receiving unit 3300, an arrangement determining unit 3400, a display form classification unit 3500, and a display control unit 3600. The image display device 3000 is also connected with a display device 3700 which is a display or the like for displaying images. An area in FIG. 17 encircled by a dotted line corresponds to the second output control unit 2600 described in Embodiments 1 and 2. Also, the user operation receiving unit 3300 corresponds to the user operation receiving unit 1300 described in Embodiments 1 and 2, and the storage unit 3100 corresponds to the storage unit 1100 described in Embodiments 1 and 2.

The storage unit 3100 is structured from an HDD (Hard Disk Drive), a memory or the like, and stores images 1101 and attributes 1102 in association with each other. For example, the storage unit 1100 receives image data of images photographed by the user from a digital camera, and stores the images in association with the attributes.

The attribute information evaluation unit 3200, user operation receiving unit 3300, arrangement determining unit 3400, display form classification unit 3500, and display control unit 3600 are structured from a processor and a memory. Each function (which is explained in detail later) of these units is realized as the processor executes a control program stored in the memory. The user operation receiving unit 3300 further includes: a USB (Universal Serial Bus) or the like for receiving inputs of images; and a mouse or the like for receiving operations from the user.

The attribute information evaluation unit 3200 has a function to, upon receiving from the user operation receiving unit 3300 a notification that an image was stored into the storage unit 3100, perform an attribute information evaluation process which will be described later. In the attribute information evaluation process, the attribute information evaluation unit 3200 refers to the attributes of the images stored in the storage unit 3100, calculates an importance component for each attribute of image by using: life event information composed of information input by the user in advance; frequently-appearing-location information; and frequently-appearing-person information generated based on the input image, and stores the calculated importance components in the storage unit 3100. Each of the life event information, frequently-appearing-location information, and frequently-appearing-person information and how to calculate the importance component for each attribute of image will be described in detail later.

The user operation receiving unit 3300 has four functions.

First, the user operation receiving unit 3300 has a function to, if an image is input into the storage unit 3100 from an external storage device connected to the USB interface or the like, obtain the creation date/time attribute and the location attribute from information attached to the image by the device that created the image, obtain the facial information attribute by, immediately after the reception of the input, analyzing the image by using a face recognition program that uses a conventional face recognition technology, and store supplementary data that is composed of the obtained attributes associated with information such as "file path", "content ID", and "type" which will be described later. Secondly, the user operation receiving unit 3300 has a function to notify the attribute information evaluation unit 3200 of an image input after storing an image and supplementary data into the storage unit 3100. Thirdly, the user operation receiving unit 3300 has a function to, if instructed to display an image from the user, instructs the arrangement determining unit 3400 to determine a display arrangement by selecting it from among a plurality of display arrangements provided for each attribute. Lastly, the user operation receiving unit 3300 has a function to, if an input of weight coefficients for each attribute output to the display device 3700 is received from the user via a slide bar, notify the display form classification unit 3500 of the weight coefficients for each attribute.

The arrangement determining unit 3400 has a function to, upon receiving from the user operation receiving unit 3300 an instruction to determine a display arrangement, perform an arrangement determining process, in which images are arranged in the order of creation date/time by a display arrangement algorithm based on the creation date/time attribute, determine a display arrangement of the images, and notify the display control unit 3600 of the determined display arrangement.

The display form classification unit 3500 has a function to perform a display form classification process which will be described later. In the display form classification process, the display form classification unit 3500 is notified from the user operation receiving unit 3300 the weight coefficients for each attribute, obtains the value of importance component for each attribute from the storage unit 3100, multiplies the weight coefficient by the importance component for each attribute, and obtains the importance level of the image by adding up all the products (results of the multiplications). The display form classification unit 3500 also has a function to notify the display control unit 3600 of the display form where the images are displayed in the same size, and the higher the importance level is, the denser the displayed image is.

The display control unit 3600 has a function to receive a display arrangement of images from the arrangement determining unit 3400, receive a display form of images from the display form classification unit 3500, obtain from the storage unit 3100 images to be displayed, and output the images to the external display device 3700 in accordance with the display arrangement and display form of images.

The display device 3700 has a function to, if it receive an input of images from the display control unit 3600, display the images on a display or the like.

<Data>

The following describes the data dealt with by the image display device 3000 having the above structure.

The image display device stores a plurality of images and attributes corresponding to the images, in association with each other in the storage unit 3100. Note that, in the present description, the images refer to still image data (JPEG (Joint Photographic Experts Group) data or the like) of photographs taken by a digital camera or the like.

FIG. 18 shows the data structure and content example of supplementary data 1800 that includes attributes associated one-to-one with the images stored in the storage unit 3100. The supplementary data 1800 includes a file path 1803, a content ID 1804, a type 1805, a creation date/time attribute 1806, a location attribute 1807, a facial information attribute 1808, a creation date/time attribute importance component 1809, a location attribute importance component 1810, and a facial information attribute importance component 1811. The following explains each element provided in the example of FIG. 18.

The file path 1803 indicates an address where a file is stored, which is determined by the user operation receiving unit 3300 when it receives specification of the place where an input image is to be stored from the user. The example of FIG. 18 indicates that the image is stored in a file "00123.xxx" in a folder "abc" stored in the storage unit 3100.

The content ID 1804 contains a numerical value that is assigned by the user operation receiving unit 3300 to an image when the image is stored into the storage unit 3100, wherein a unique numerical value is assigned to each image.

The example of FIG. 18 indicates that the content ID that uniquely identifies the image at "abc/00123.xxx" is "8".

The type 1805 indicates a type of a content. In the present description, it is presumed that every content is a type "image". The "image" here indicates that an image contained in a file is a still image.

The creation date/time attribute 1806 indicates, by numerical values, the year, month, day, and time on which the image was created. This data is attached to the image by a device (e.g., digital camera) that has created the image, as the data indicating the time when the image was created. The example of FIG. 18 indicates that the image was created at 15:01 on Nov. 3, 2009.

The location attribute 1807 indicates, by numerical values, the latitude and latitude of the location where the image was created. This data is attached to the image by a device (e.g., digital camera) that has created the image, as the data indicating the location when the image was created. The example of FIG. 18 indicates that the image was created at a location of latitude x6 and longitude y6.

The facial information attribute 1808 is given when the user operation receiving unit 3300 analyzes the image. In the example of FIG. 18, the number of persons is "2", which means two persons are included in the image, and the persons are identified by facial numbers "1" and "2", and are each represented by parameter values "parameter A", "parameter B" and the like that indicate the image characteristics for the face identification, as the results of analysis performed by the face recognition program.

The creation date/time attribute importance component 1809, location attribute importance component 1810, and facial information attribute importance component 1811 indicate values of importance components of image for the respective attributes, the values being given by the attribute information evaluation unit 3200 and being in a range from 0 to 1. The details will be described later.

Next, the following describes the life event information, frequently-appearing-location information, and frequently-appearing-person information that are used by the attribute information evaluation unit 3200.

First, the life event information is described. FIG. 19 shows an example of the life event information. The life event information is a set of date/time information indicating the dates and times of the events scheduled for the user's life. In this example, it is assumed that the user is a woman born on May 10, 1990. Accordingly, the birthday is May 10, and scheduled events include a shrine visit that is to take place one month after his/her birth, namely on Jun. 10, 1990, and the first girl's seasonal festival that is to take place on Mar. 3, 1991. The life event information as shown in FIG. 19 is stored in the storage unit 3100 by the user. Note that the life events and the dates/times can be determined by the user, and thus dates/times other than those shown in FIG. 19 may be input.

Next, the frequently-appearing-location information is described. FIG. 20 shows an example of the frequently-appearing-location information. Here, the frequently-appearing-location information indicates locations where the user frequently visits. For example, as shown in FIG. 20, home of the user and the parents' home are frequently appearing locations. The location of each of the locations indicated by the frequently-appearing-location information is represented by the latitude and longitude information. In FIG. 20, {35, 135} represents latitude 35 degrees and longitude 135 degrees. The frequently-appearing-location information as shown in FIG. 20 is stored in the storage unit 3100 by the user. Note that, since the frequently-appearing-location information indicates any locations where the user regards as "frequently appearing locations", locations other than those shown in FIG. 20 may be input.

Lastly, the frequently-appearing-person information is described. FIG. 21 shows an example of the frequently-appearing-person information. Here, the frequently-appearing-person information indicates persons with whom the user is frequently taken in pictures. For example, as shown in FIG. 21, the user him/herself and the parents of the user are frequently appearing persons. Note that FIG. 21 also shows the facial information of the frequently appearing persons, the facial information being represented by parameter values "parameter A", "parameter B" and the like, which are obtained in the same manner by the face recognition program that was used to obtain the parameter values in the facial information attribute 1808 shown in FIG. 18. The frequently-appearing-person information as shown in FIG. 21 is stored in the storage unit 3100 by the user. Note that, since the frequently-appearing-person information indicates any persons whom the user regards as "frequently appearing persons", persons other than those shown in FIG. 21 may be input.

<Operation>

The following describes the operation of the image display device 3000 having the above structure and data.

Figure 22:
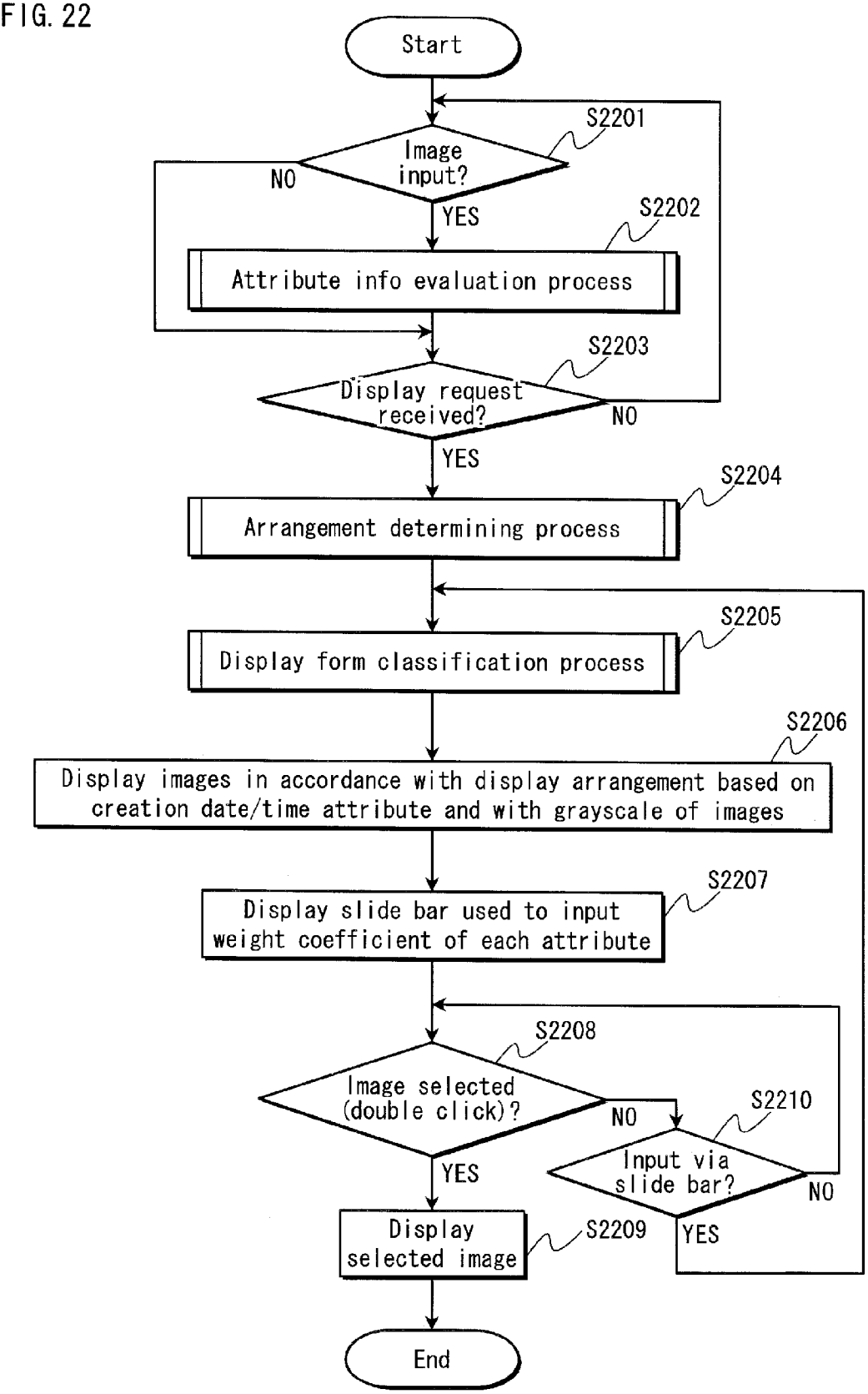
FIG. 22 is a flowchart of a process performed by the image display device 3000.

FIG. 22 is a flowchart of the display process performed by the image display device 3000.

First, if an image is input by the user, that is say, if an external storage device (a flash memory or the like) is attached to the USB interface or the like, and an image input command is input by the user (step S2201), the user operation receiving unit 3300 transfers the image received from the external storage device to the storage unit 3100, and the attribute information evaluation unit 3200 performs the attribute information evaluation process on the newly input image (step S2202).

Here, the attribute information evaluation process is described in detail with reference to FIG. 23.

Figure 23:
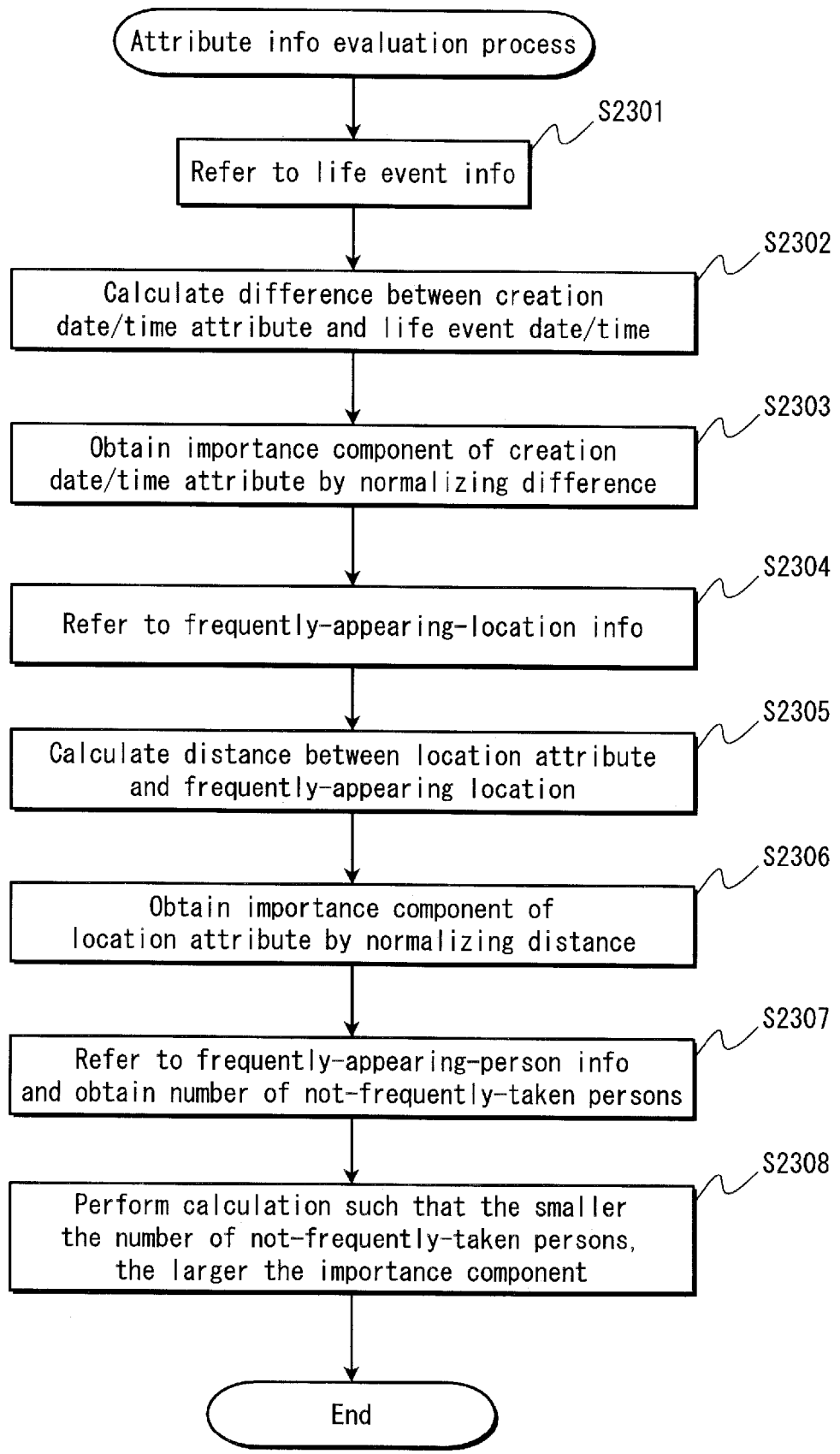
FIG. 23 is a flowchart of an attribute information evaluation process performed by an attribute information evaluation unit 3200.

FIG. 23 is a flowchart of the attribute information evaluation process performed in step S2202 by the attribute information evaluation unit 3200.

In FIG. 23, the process for obtaining the creation date/time attribute importance component 1809 from the data shown in FIG. 18 is performed in steps S2301 through S2303, the process for obtaining the location attribute importance component 1810 is performed in steps S2304 through S2306, and the process for obtaining the facial information attribute importance component 1811 is performed in steps S2307 through S2308.

First, steps S2301 through S2303 are explained.

The attribute information evaluation unit 3200 refers to the life event information shown in FIG. 19 (step S2301).

After referring to the life event information, the attribute information evaluation unit 3200 calculates, in units of days, a value of difference between the date/time indicated by the creation date/time attribute of the image targeted for the attribute information evaluation process and a date/time which, among the dates/times registered in the life event information, is closest to the date/time indicated by the creation date/time attribute (step S2302). In the calculation of the value of difference, a life event, such as the birthday, for which the year is not specified is assumed to be in the same year as the date/time indicated by the creation date/time attribute.

For example, in the attribute information evaluation process performed on an image having the attributes shown in FIG. 18, if the life event information shown in FIG. 19 has been stored, the date/time closest to "Nov. 3, 2009" indicated by the creation date/time attribute is "May 10, 2009" of the birthday, and thus the value of difference is calculated as 177 days.

After the calculation of the value of difference in step S2302, the attribute information evaluation unit 3200 obtains the importance component of the creation date/time attribute by normalizing the value of difference such that the greater the value of difference is, the closer to 1 the importance component is, and the smaller the value of difference is, the closer to 0 the importance component is (step S2303). Thus the importance component of the creation date/time attribute is equal to or greater than 0, and smaller than 1. For example, the calculation is expressed as "the importance component of the creation date/time attribute=(365−difference value)÷365". If the result value is a negative value, the value is turned into 0. In the present example, the importance component of the creation date/time attribute=(365−177)÷365=0.52.

Next, steps S2304 through S2306 are explained.

The attribute information evaluation unit 3200 refers to the frequently-appearing-location information shown in FIG. 20 (step S2304).

After referring to the frequently-appearing-location information, the attribute information evaluation unit 3200 calculates, in units of kilometers, a distance between the location indicated by the location attribute of the image targeted for the attribute information evaluation process and a location which, among the locations registered in the frequently-appearing-location information, is closest to the location indicated by the location attribute (step S2305). For example, for the image having the attributes shown in FIG. 18, the frequently-appearing-location information shown in FIG. 20 is registered. Then the distance between the user's home and the location attribute "latitude x6, longitude y6" is 30 km, and the distance between the user's parents' home and the location attribute "latitude x6, longitude y6" is larger than 30 km, the distance is calculated as 30 km.

After calculating the distance from the frequently appearing location in step S2305, the attribute information evaluation unit 3200 obtains the importance component of the location attribute by normalizing the calculated distance such that the greater the distance is, the closer to 1 the importance component is, and the smaller the distance is, the closer to 0 the importance component is (step S2306). Thus the importance component of the location attribute is equal to or greater than 0, and smaller than 1. For example, the calculation is expressed as "the importance component of the location attribute=distance÷100". If the value of (distance÷100) is greater than 1, the importance component of the location attribute is regarded as 1. In the present example, the importance component of the location attribute=30÷100=0.3.

Lastly, steps S2307 and S2308 are explained.

After calculating the importance component of the location attribute, the attribute information evaluation unit 3200 refers to the frequently-appearing-person information as shown in FIG. 21, and obtains the number of persons who are not frequently taken in pictures (step S2307). For example, for the image having the attributes shown in FIG. 18, the frequently-appearing-person information shown in FIG. 21 is registered. Then if it is judged by comparison that both of the two persons are not included in the frequently-appearing-person information, the number of persons who are not frequently taken in pictures is two.

After referring to the frequently-appearing-person information and obtaining the number of persons who are not frequently taken in pictures, the attribute information evaluation unit 3200 performs a calculation such that the smaller the number of persons who are not frequently taken in pictures is, the closer to 1 the importance component of the facial information attribute is (step S2308). For example, the calculation is expressed as "the importance component of the facial information attribute=1÷the number of persons who are not frequently taken in pictures". In this calculation, if the number of persons who are not frequently taken in pictures is 0, the importance component is 0. In the present example, the importance component is obtained as 1÷2=0.5.

This completes the explanation of the attribute information evaluation process with reference to FIG. 23, and returns back to step S2201 in FIG. 22.

If it is judged that no image has been input by the user (NO in step S2201), or the attribute information evaluation process shown in FIG. 23 (step S2202 shown in FIG. 22) is completed, an image display request from the user is awaited (step S2203). If it is judged that an image display request has been input by the user (YES in step S22013, the arrangement determining unit 3400 performs the arrangement determining process (step S2204).

Figure 24:
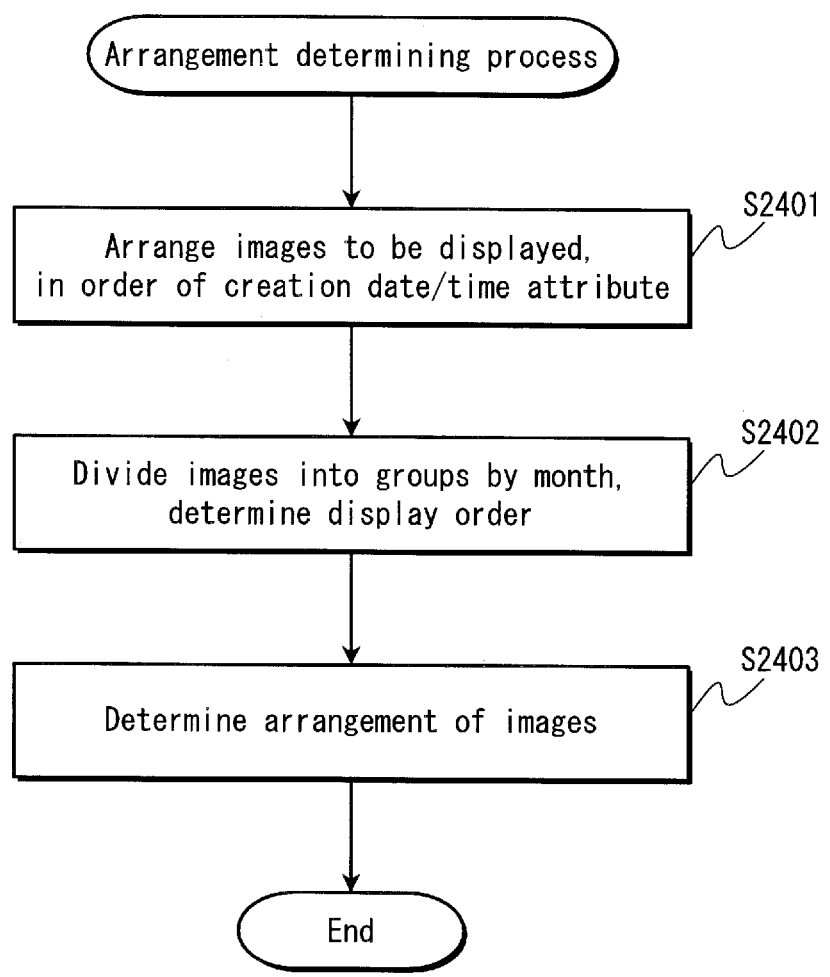
FIG. 24 is a flowchart of an arrangement determining process performed by an arrangement determining unit 3400.

The following describes the arrangement determining process in detail with reference to FIG. 24.

The arrangement determining unit 3400 arranges the images to be displayed, in the order of creation date/time attribute (step S2401). With this operation, the images are arranged in the order of date. Subsequently, the arrangement determining unit 3400 divides the images into groups by month, and determines the display order (step S2402). With this operation, the images are classified into months, and the order of dates in which images are displayed in each month is determined. Lastly, the arrangement of the images is determined (step S2403).

Figure 25:
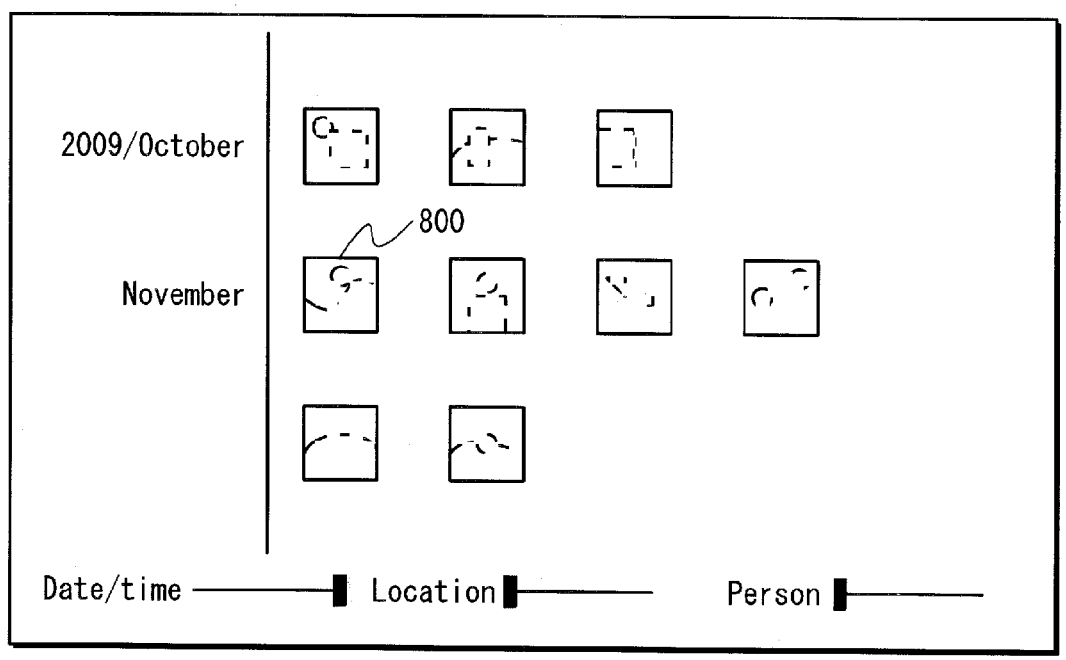
FIG. 25 illustrates an example of output results by the image display device 3000.

The following describes how the arrangement of images is determined in step S2403. As shown in FIG. 25, first, the months are output on the left side of the screen so that the creation date/time can be recognized. Note that, although, in the example of FIG. 25, images are displayed for each month, the images may be displayed for each hour, for each day, or for each year. Next, the images are arranged on the screen in the order of creation date/time. Accordingly, the arrangement is determined such that images whose creation date/time attributes indicate different months are displayed in different rows, and images whose creation date/time attributes indicate the same month are displayed in the horizontal direction in the order of date.

In the example of FIG. 25, the images are arranged such that vertically three images and horizontally four images are displayed in row. Alternatively, if all the images cannot be displayed by the arrangement of vertical three images and horizontal four images, a scroll bar or the like may be provided so that the screen can be scrolled to display all the images.

This completes the explanation of the arrangement determining process with reference to FIG. 24, and returns back to step S2203 in FIG. 22.

If it is judged that no image display request has been input by the user (NO in step S2203), the control returns to step S2201.

After the arrangement determining process shown in FIG. 24 (step S2204 in FIG. 22) is completed, the display form classification unit 3500 performs the display form classification process (step S2205).

Here, the display form classification process is described in detail with reference to FIG. 26.

First, the importance level of each image to be displayed is calculated (step S2601). The importance level is obtained by multiplying the weight coefficient of each attribute, which is between values of 0 and 1, by the importance component, and adding up all the results of the multiplications.

Subsequently, the images are classified into three groups by value of importance level (step S2602). More specifically, the classification is performed by obtaining the sum of the values of weights, and then classifying the images into a group in which the importance level belongs to a range from 0 to ⅓ of the sum of the values of weights, a group in which the importance level belongs to a range from ⅓ to ⅔ of the sum of the values of weights, and a group in which the importance level belongs to a range from ⅔ of the sum of the values of weights to 3/3 of the sum of the values of weights. Note that the images may be classified into any number of groups as far as the number is at least three.

Figure 27:
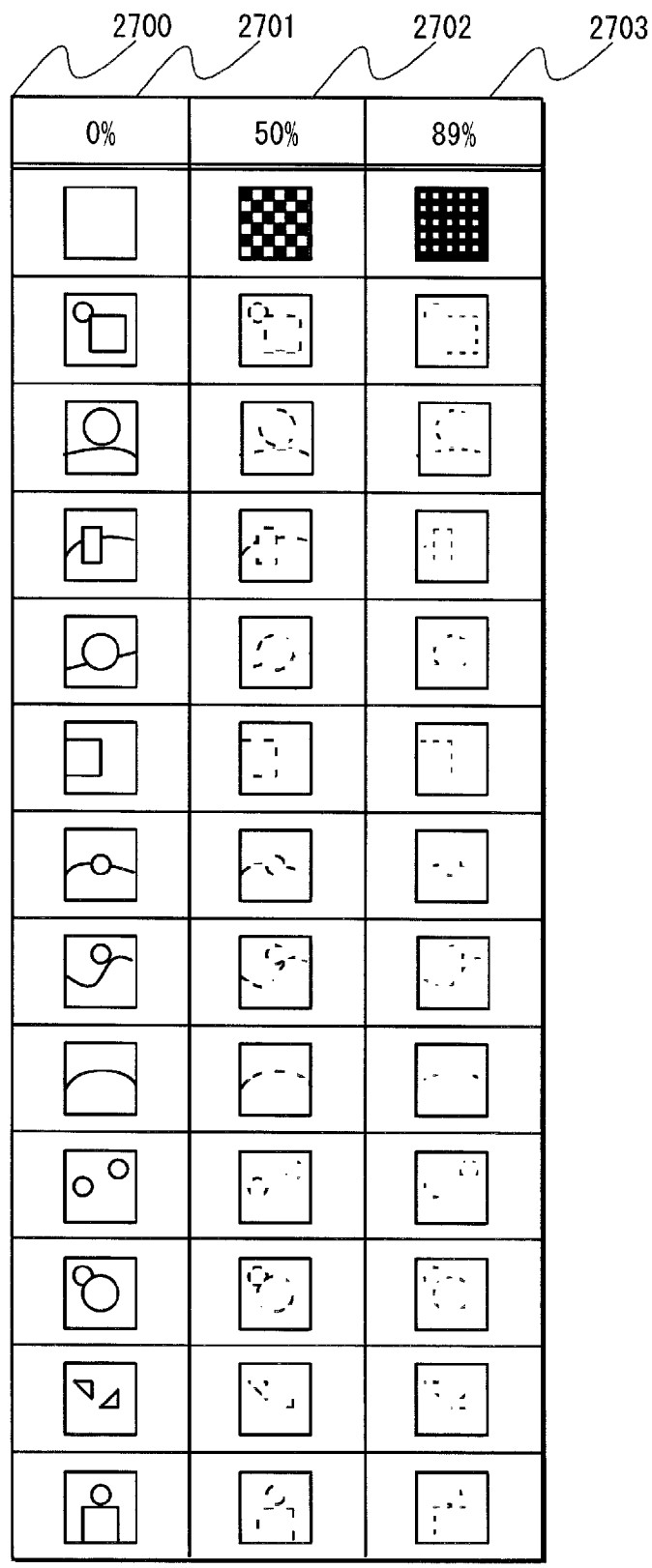
FIG. 27 illustrates a grayscale process performed by the display form classification unit 3500.

Lastly, the display grayscale level is determined for each group (step S2603). The display grayscale level is determined as follows. The explanation is provided with reference to FIG. 27. A table 2700 shows examples of display grayscale level. First, the images to be displayed are reduced to a constant size (for example, vertical 60 pixels×horizontal 60 pixels). Hereinafter, the images having been reduced in this way are referred to as "reduced images".

Column 2701 of the table includes images that have been created by using the pixels of the reduced images as they are. Accordingly, they are reduced images themselves. The "0%" shown in the uppermost element of column 2701 means that 0% of information has been reduced from the original reduced image.

Each image in column 2702 was created by reducing 50% of information, more specifically, by using only two pixels out of each set of vertical 2 pixels×horizontal 2 pixels constituting the reduced image, and masking the remaining pixels. The "50%" shown in the uppermost element of Column 2702 means that 50% of information has been reduced from the original reduced image.

Each image in column 2703 was created by reducing 89% of information, more specifically, by using only one pixel out of each set of vertical 3 pixels×horizontal 3 pixels constituting the reduced image in column 2701, and masking the remaining pixels. The "89%" shown in the uppermost element of Column 2703 means that 89% of information has been reduced from the original reduced image.

As described above, each display grayscale level is determined by reducing a certain amount of information from each reduced images. With this structure, it is possible to highlight the images in which the user is highly interested, by leaving the images as they are without reducing information. This makes it easy for the user to search for an image because the user can take account the interest of the user. The display form is determined by using the reduced images shown in FIG. 27 that have been created to have different levels of grayscale. For example, with regard to the group in which the importance level belongs to a range from ⅔ of the sum of the values of weights to 3/3 of the sum of the values of weights, the images belonging to column 2701 are displayed. Also, with regard to the group in which the importance level belongs to a range from ⅓ to ⅔ of the sum of the values of weights, the images belonging to column 2702 are displayed; and with regard to the group in which the importance level belongs to a range from 0 to ⅓ of the sum of the values of weights, the images belonging to column 2703 are displayed.

Figure 26:
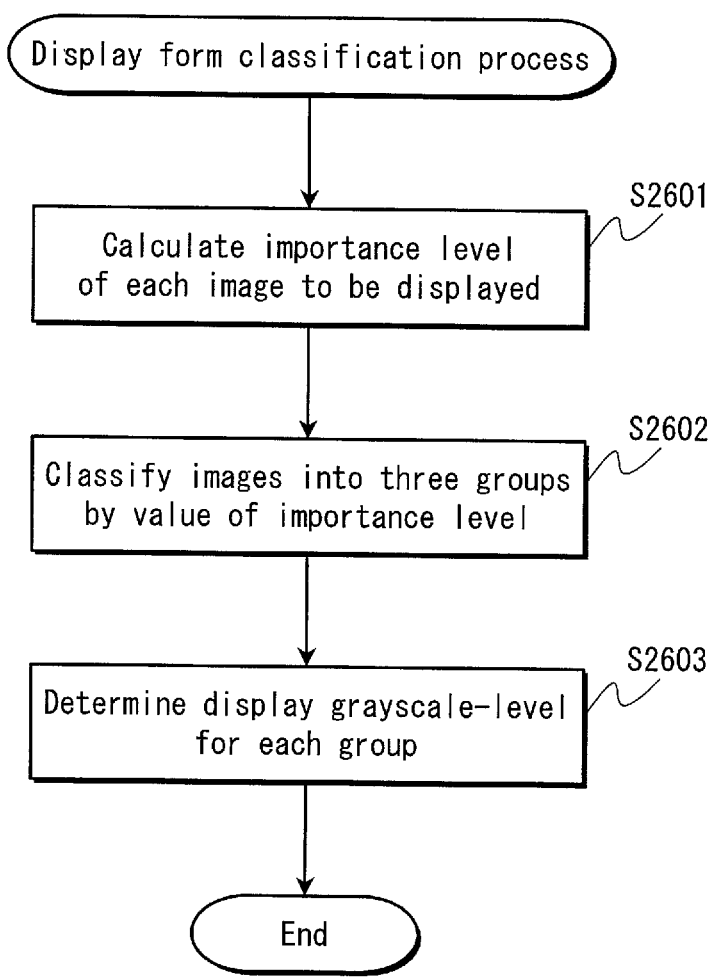
FIG. 26 is a flowchart of a display form classification process performed by a display form classification unit 3500.

This completes the explanation of the display form classification process with reference to FIG. 26, and returns back to step S2206 in FIG. 22.

Subsequently, the display control unit 3600 displays images on the screen in accordance with the display arrangement based on the creation date/time attribute and with the grayscale levels of images (step S2206), and displays a slide bar that is used to input the weight coefficient of each attribute (step S2207).

FIG. 25 illustrates an example of the screen in the current state. The small rectangles such as a rectangle 800 in FIG. 25 represent images, and the higher the importance level is, the denser the displayed image is, and the lower the importance level is, the paler the displayed image is. For example, the rectangle 800 in FIG. 25 represents an image related to the attributes shown in FIG. 18, and the importance level of the creation date/time attribute is 0.52, thus the image is displayed with an intermediate level of grayscale. Also, the slide bars displayed in the lower part of the screen can be operated by a mouse, the leftmost end of each slide bar represents weight coefficient 0, the rightmost end of each slide bar represents weight coefficient 1, and the weight coefficient changes continuously between 0 and 1.

Figure 28:
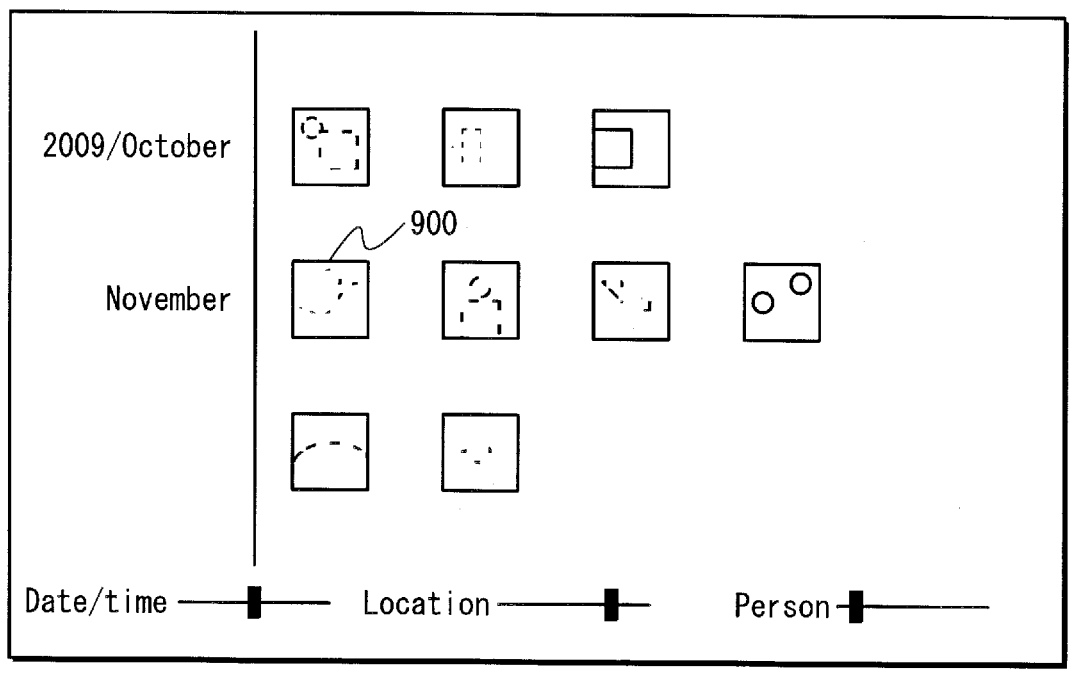
FIG. 28 illustrates another example of output results by the image display device 3000.

Subsequently, a selection of an image by the user is awaited (step S2208), and if the user has selected an image by double-clicking the mouse (YES in step S2208), the selected image is displayed (step S2209), and the process ends. If the user has not selected an image (NO in step S2208), an input via the slide bar is awaited (step S2210), and if there is no input via the slide bar (NO in step S2210), the control returns to step S2208. If there is an input via the slide bar (YES in step S2210), the control returns to step S2205, and the screen is displayed again. FIG. 28 illustrates an example of the screen displayed when there is an input via the slide bar. The small rectangles such as a rectangle 900 in FIG. 28 represent images, as in FIG. 25. The rectangle 900 in FIG. 28 represents an image related to the attributes shown in FIG. 18, and is displayed most palely since the importance level of the image was decreased by an input via the slide bar.

Embodiment 4

The following describes an image display device 4000 as one embodiment of the image display device.

<Summary>

Figure 29:
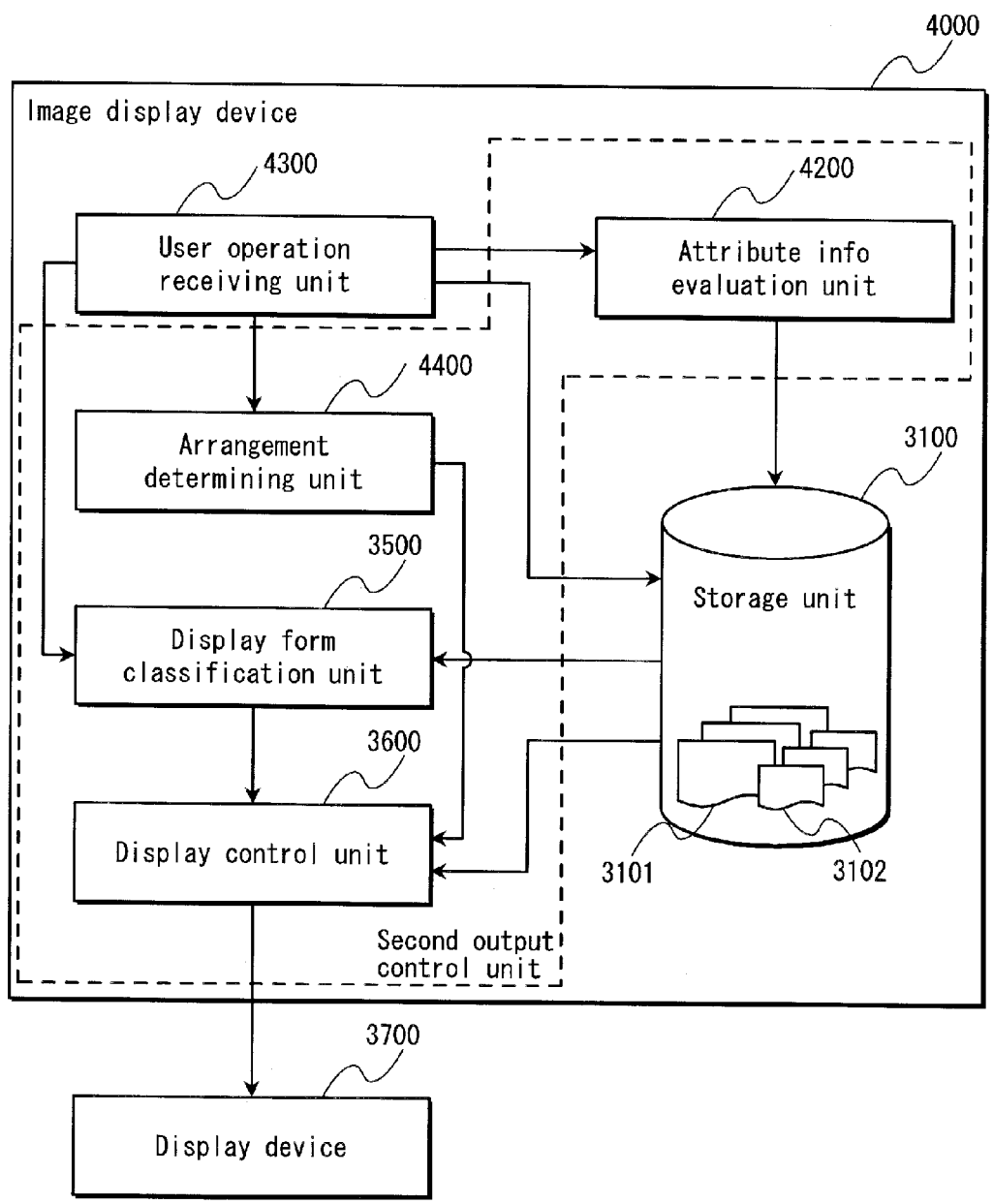
FIG. 29 illustrates a structure of an image display device 4000 in Embodiment 4.

FIG. 29 illustrates the structure of the image display device 4000 in Embodiment 4.

The image display device 4000 has basically the same structure of the image display device 3000 in Embodiment 3, except that a structural element has been changed so as to support the user in searching for an image that resembles a user-selected image.

More specifically, as shown in FIG. 29, the structure of the image display device 3000 in Embodiment 3 has been changed by replacing the attribute information evaluation unit 3200 with an attribute information evaluation unit 4200 that has a function to calculate the importance component for each attribute by using the attributes of the user-selected image and the attributes of displayed images. This makes it possible to support the user in searching for an image, by highly evaluating the importance level of an image that resembles a user-selected image, and displaying the resembling image more densely than other images that do not resemble the user-selected image.

<Structure and Data>

The following describes the structure of the image display device 4000.

The structure of the image display device 4000 is described with reference to FIG. 29. As shown in FIG. 29, the image display device 4000 includes the storage unit 3100, display form classification unit 3500, and display control unit 3600 that are also included in the image display device described in Embodiment 3. Here, description of the structural elements that are the same as those of the image display device 3000 is omitted.

An attribute information evaluation unit 4200, a user operation receiving unit 4300, and an arrangement determining unit 4400 are structured from a processor and a memory. The functions which are explained later are realized as the processor executes a control program stored in the memory. The user operation receiving unit 4300 further includes: a USB (Universal Serial Bus) or the like for receiving inputs of images; and a mouse or the like for receiving operations from the user.

The attribute information evaluation unit 4200 has a function to, upon receiving a notification from the user operation receiving unit 4300 that the user has selected an image to search for another image resembling the user-selected image, calculate the importance component for each attribute by using the attributes of the user-selected image and the attributes of images displayed on the display device 3700, and store values of the calculated importance components into the storage unit 3100. How to calculate the importance component for each attribute will be described later.

The user operation receiving unit 4300 has four functions. First, it has a function to, if an image is input into the storage unit 3100 from an external storage device connected to the USB interface or the like, obtain the creation date/time attribute and the location attribute from information attached to the image by the device that created the image, obtain the facial information attribute by, immediately after the reception of the input, analyzing the image by using a face recognition program, and store the obtained attributes in association with information such as "file path", "content ID", and "type". Also, the user operation receiving unit 4300 has a function to, if instructed to display an image from the user, instructs the arrangement determining unit 4400 to determine a display arrangement by selecting it from among a plurality of display arrangements provided for each attribute. Furthermore, the user operation receiving unit 4300 has a function to, if an input of weight coefficients for each attribute output to the display device 3700 is received from the user via a slide bar, notify the display form classification unit 3500 of the weight coefficients for each attribute. Lastly, the user operation receiving unit 4300 has a function to, if the user has selected an image from among images output to the display device 3700 to search for another image resembling the selected image, instruct the attribute information evaluation unit 4200 to calculate the importance component for each attribute.

The arrangement determining unit 4400 has a function to, upon receiving from the user operation receiving unit 4300 an instruction to determine a display arrangement, notify the display control unit 3600 that a display arrangement in which images are arranged in the order of creation date/time determine is used. Note that the data stored in the storage unit 3100 of the image display device 4000 having the above structure is the same as the data dealt with in Embodiment 3.

<Operation>

The following describes the operation of the image display device 4000 having the above structure and data.

Figure 30:
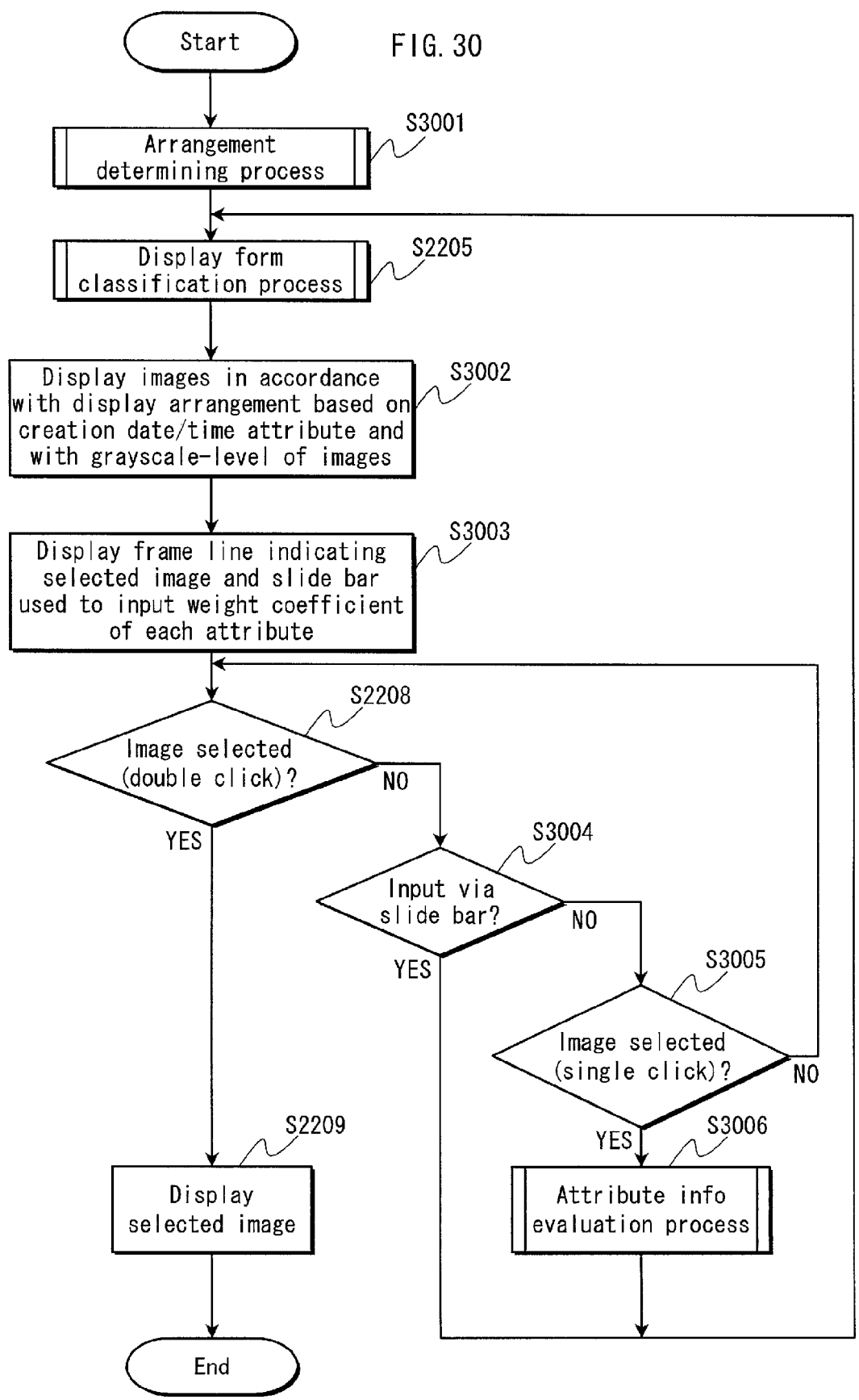
FIG. 30 is a flowchart of a process performed by the image display device 4000.

FIG. 30 is a flowchart showing the operation of the image display device 4000. Note that the description of the same processes as those of the flowchart described in Embodiment 3, which are identified by the same reference signs, is omitted here.

First, the user operation receiving unit 4300 receives a display request from the user, and instructs the arrangement determining unit 4400 to determine a display arrangement. Upon receiving the instruction, the arrangement determining unit 4400 performs the arrangement determining process (step S3001).

Figure 31:
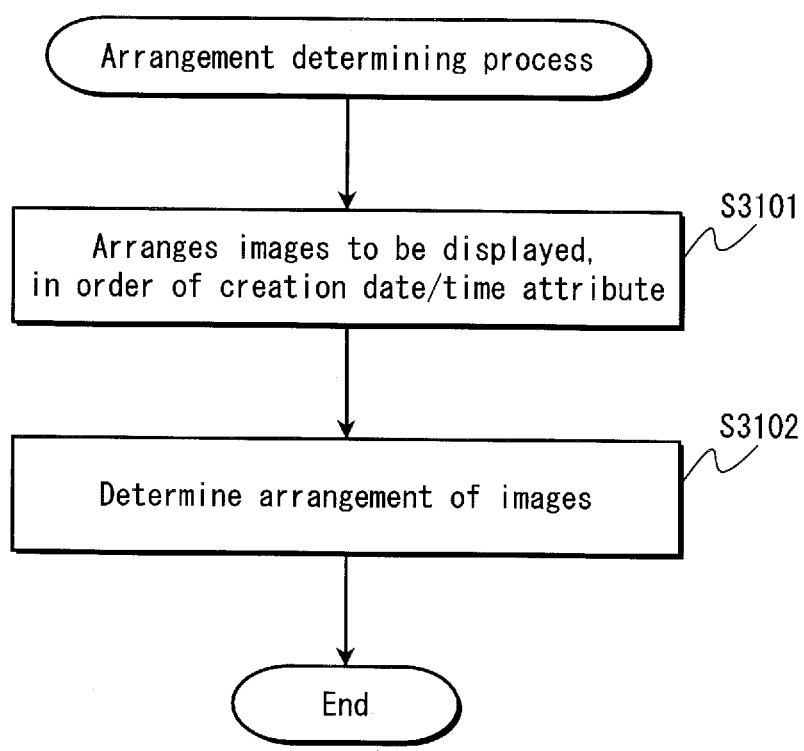
FIG. 31 is a flowchart of an arrangement determining process performed by an arrangement determining unit 4400.

The following describes the arrangement determining process in detail with reference to FIG. 31.

The arrangement determining unit 4400 arranges the images to be displayed, in the order of creation date/time attribute (step S3101). With this operation, the images are arranged in the order of date. Next, the arrangement of the images is determined (step S3102).

Figure 32:
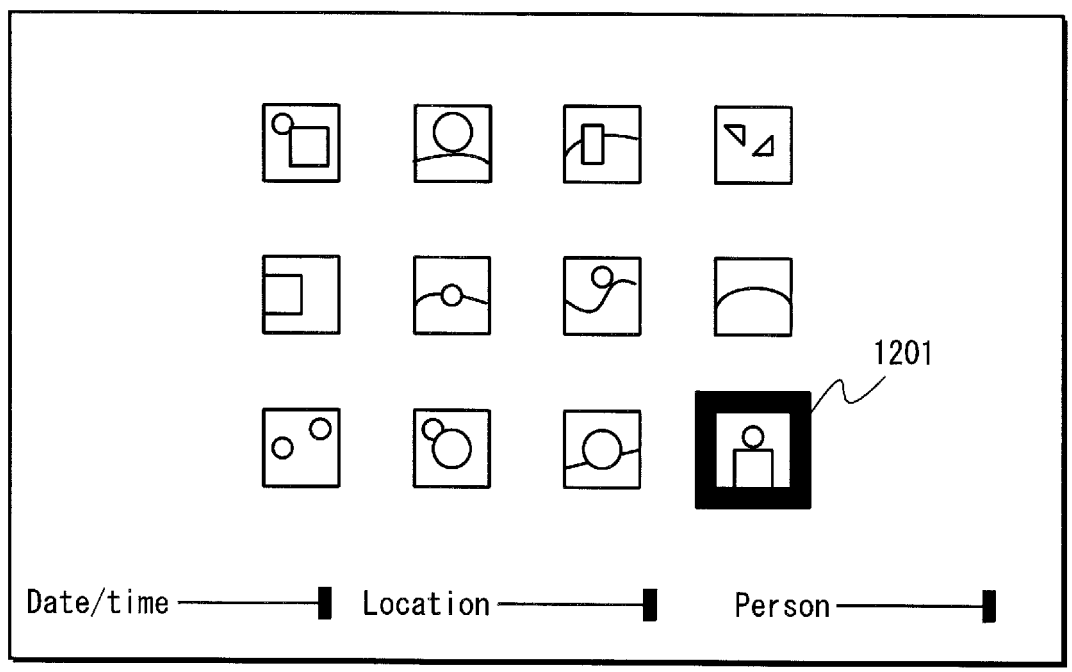
FIG. 32 illustrates an example of output results by the image display device 4000.

The following describes how the arrangement of images is determined in step S3102. In step S3102, the images are arranged such that vertically three images and horizontally four images are displayed in a lattice pattern. The images stored in the storage unit 3100 are placed in the arrangement in the order of creation date/time attribute. In the example of FIG. 32, the images are arranged such that vertically three images and horizontally four images are displayed in row. Alternatively, if all the images cannot be displayed by the arrangement of vertical three images and horizontal four images, a scroll bar or the like may be provided so that the screen can be scrolled to display all the images.

This completes the explanation of the arrangement determining process with reference to FIG. 31, and returns back to step S2205 in FIG. 30.

After determining the display arrangement, the display form classification unit 3500 performs the display form classification process to determine the grayscale level of each image in display by using the importance component and weight coefficient of each attribute (step S2205). The images are displayed in accordance with the arrangement in the order of creation date/time attribute and the grayscale levels of images in display determined in steps S3001 and S2205 (step S3002). Subsequently, a frame line, which indicates an image selected by the user by single-clicking a mouse, and a slide bar, which is used to input the weight coefficient of each attribute, are displayed (step S3003). FIG. 32 illustrates an example of the screen in the current state. In FIG. 32, element 1201 is the frame line. The frame line moves to a selected image each time the user selects an image by single-clicking the image. The images are displayed such that the more a displayed image resembles a user-selected image, the denser the displayed image is, and the less a displayed image resembles a user-selected image, the paler the displayed image is. In FIG. 32, all images are displayed with the same density and the weight coefficients for each attribute are set to 1. This is because they are in the initial state which has been set to facilitate the user in selecting an image.

Subsequently, a selection of an image by the user is awaited (step S2208), and if the user has selected an image by double-clicking the mouse (YES in step S2208), the selected image is displayed (step S2209), and the process ends. If the user has not selected an image (NO in step S2208), an input via the slide bar is awaited (step S3004), and if there is an input via the slide bar (YES in step S3004), the control returns to step S2205. If there is no input via the slide bar (NO in step S3004), a selection of an image by single-clicking the mouse is awaited (step S3005). If the user selects an image by single-clicking the mouse (YES in step S3005), the attribute information evaluation unit 4200 performs the attribute information evaluation process (step S3006).

Here, the attribute information evaluation process is described in detail with reference to FIG. 33.

Figure 33:
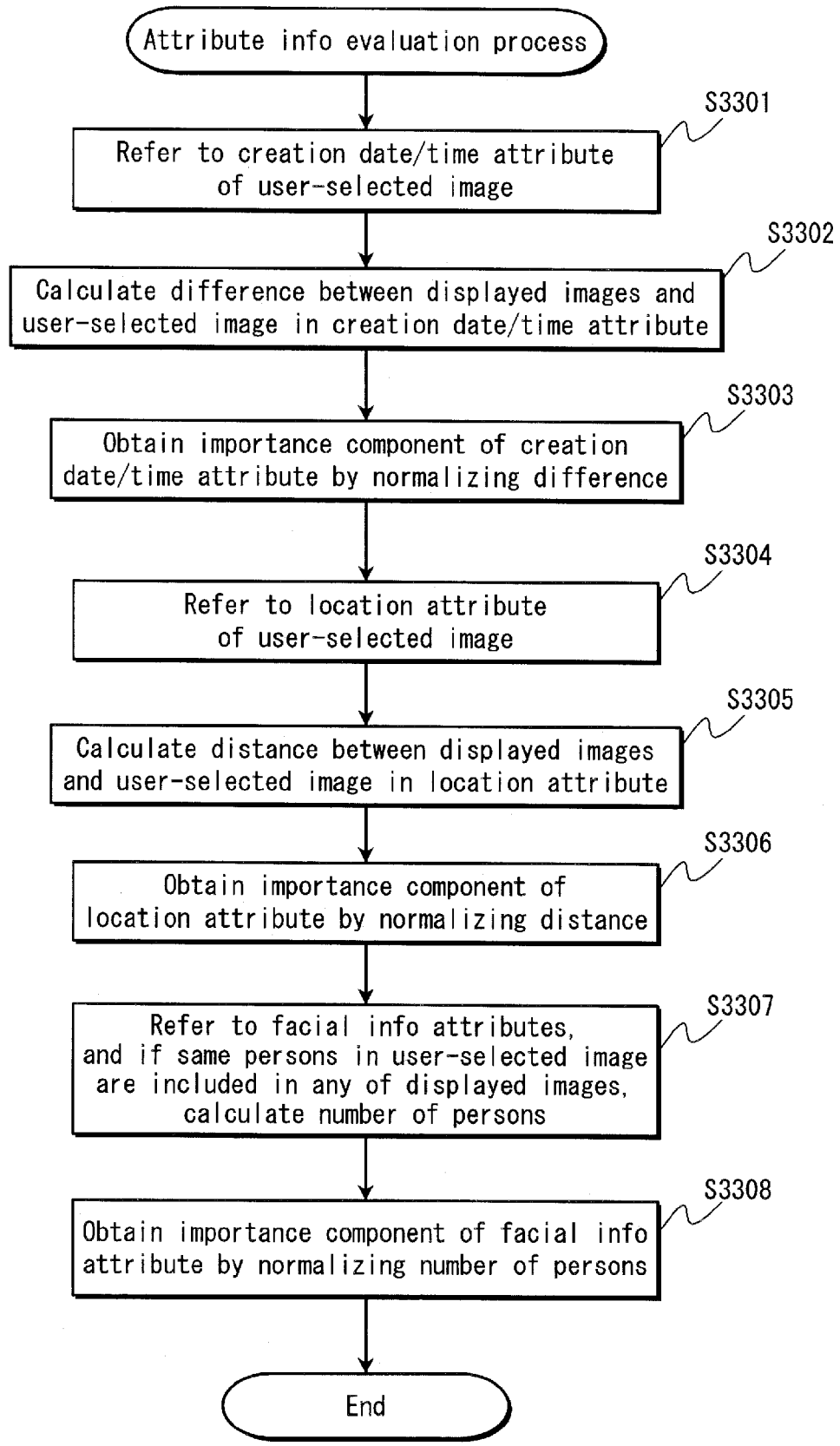
FIG. 33 is a flowchart of an attribute information evaluation process performed by an attribute information evaluation unit 4200.

FIG. 33 is a flowchart of the attribute information evaluation process performed in step S3006 by the attribute information evaluation unit 4200. The attribute information evaluation unit 4200 executes the attribute information evaluation process if the user selects an image by single-clicking the mouse.

In FIG. 33, the process for obtaining the creation date/time attribute importance component 1809 from the data shown in FIG. 18 is performed in steps S3301 through S3303, the process for obtaining the location attribute importance component 1810 is performed in steps S3304 through S3306, and the process for obtaining the facial information attribute importance component 1811 is performed in steps S3307 through S3308.

First, steps S3301 through S3303 are explained.

The attribute information evaluation unit 4200 refers to the creation date/time attribute of the user-selected image (step S3301).

After referring to the creation date/time attribute, the attribute information evaluation unit 4200 calculates, in units of days, a value of difference between the creation date/time attribute of the displayed image and the creation date/time attribute of the user-selected image (step S3302).

After the calculation of the value of difference in step S3302, the attribute information evaluation unit 4200 normalizes the value of difference such that the greater the value of difference is, the closer to 1 the importance component is, and the smaller the value of difference is, the closer to 0 the importance component is (step S3303). For example, the calculation is expressed as "the importance component of the creation date/time attribute=(365−difference value)÷365". If the result value is a negative value, the value is turned into 0.

This completes explanation of steps S3301 through S3303 in which the importance component for the creation date/time attribute is calculated.

Next, steps S3304 through S3306 are explained.

After calculating the importance component for the creation date/time attribute, the attribute information evaluation unit 4200 refers to the location attribute of the user-selected image (step S3304).

After referring to the location attribute, the attribute information evaluation unit 4200 calculates, in units of kilometers, a distance between the location attribute of each displayed image and the location attribute of the user-selected image (step S3305).

Subsequent to the calculation of the distance, the attribute information evaluation unit 4200 normalizes the calculated distance such that the greater the distance is, the closer to 1 the importance component is, and the smaller the distance is, the closer to 0 the importance component is (step S3306). For example, the calculation is expressed as "the importance component of the location attribute=1−(distance÷100)". If the result value is a negative value, the value is turned into 0.

This completes explanation of steps S3304 through S3306 in which the importance component for the creation date/time attribute is calculated.

Lastly, steps S3307 and S3308 are explained.

After calculating the importance component of the location attribute, the attribute information evaluation unit 4200 refers to the facial information attributes of the user-selected image and the displayed images, and if the same persons in the user-selected image are included in any of the displayed images, calculates the number of the same persons (step S3307).

After the calculation of the number of the same persons, the attribute information evaluation unit 4200 performs the normalization such that the larger the number obtained in step S3307 is, the closer to 1 the importance component is, and the smaller the number obtained in step S3307 is, the closer to 0 the importance component is (step S3308). Let "a" denote the number of persons included in the user-selected image, and let "b" denote the number of persons in the displayed images, then the importance component is expressed as "b a".

This completes explanation of steps S3307 through S3308 in which the importance component for the facial information attribute is calculated.

This completes the explanation of the attribute information evaluation process with reference to FIG. 33, and returns back to step S3005 in FIG. 30.

Figure 34:
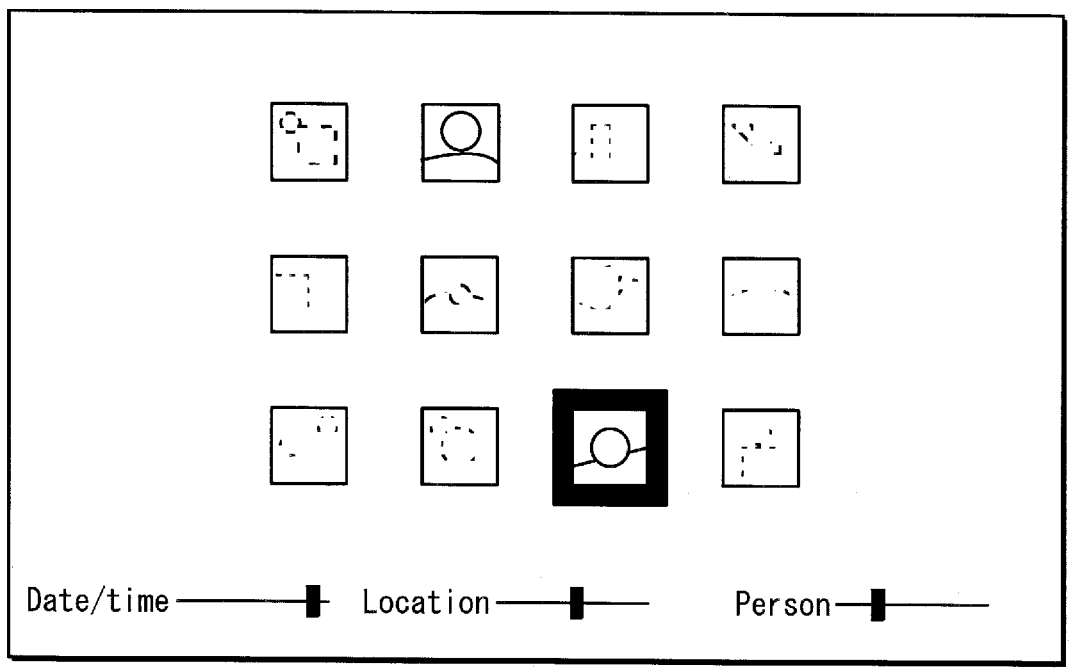
FIG. 34 illustrates another example of output results by the image display device 4000.

If the user does not select an image by single-clicking the mouse (NO in step S3005), the control returns to step S2208. Also, after the attribute information evaluation process in step S1106 is completed, the control returns to step S2205, and the screen is displayed again. FIG. 34 illustrates an example of the screen displayed when there is an input via the slide bar or a selection by single-clicking the mouse. In this example of screen display, the more the images resemble the image encircled by the frame line, which is the image that the user has selected by single-clicking the mouse, the denser the images are, and the less the images resemble the image encircled by the frame line, the paler the images are.

<Supplementary Notes>

Up to now, the present invention has been described through Embodiments 1 through 4, embodiments of a content output device. However, the present invention is not limited to the content output devices described in the above embodiments, but the content output devices described in the above embodiments may be further modified, for example, as follows.

(1) In Embodiments 1 and 2, images (still images) are stored in the storage unit 1100, and attributes of the images are used to retrieve the recommended images. However, instead of the images (still images), video or audio contents may be stored in the storage unit, and attributes of the contents may be used to retrieve recommended contents. In that case, "video" or "audio" may be recorded in the "type" in the data structure shown in FIG. 2.

In the case of video, if a video display request is received in step S301 and a plurality of videos are to be displayed, representative scenes of the videos may be provided as thumbnail images, or the videos may be reproduced in a reduced size without audio. Also, if a video interested by the user is selected in step S303 of FIG. 3, and recommended videos are displayed in step S308, the video selected by the user may be reproduced in the left-hand side of the screen, and the recommended videos may be displayed in the right-hand side, as shown in FIGS. 9 and 14. Here, representative scenes of the recommended videos may be provided as thumbnail images, or the recommended videos may be reproduced in a reduced size without audio.

In the case where audios are presented instead of images, if an audio presentation request is received in step S301 of FIG. 3 and a plurality of audios are to be presented, an icon such as a facial photo of the creator or a musical note sign may be displayed for each audio, together with an attribute such as the creation date/time attribute or the creator's name attribute. Also, if an audio interested by the user is selected in step S303 of FIG. 3, and recommended audios are presented in step S308, the audio selected by the user may be reproduced while an icon indicating the user selected audio is displayed in the left-hand side of the screen, and icons indicating recommended audios may be displayed in the right-hand side, as shown in FIGS. 9 and 14.

Furthermore, the storage unit 1100 may store variable formats of data such as images, videos, and audios. In this case, the user preference identifying unit 1200 may divide the data into groups by keyword, and then when counting the number of images for each group, it may assign a weight to each piece of data such that a different weight is assigned to each format of data.

(2) In the above embodiments, the user preference identifying unit 1200 regards, as a user high preference group, a group that includes a large number of contents. However, not limited to this, any of the following may be regarded as a user high preference group: (a) a group that includes contents that have been reproduced in total a large number of times; (b) a group that includes contents that have been reproduced in total for long hours; (c) a group that has a lot of points, where the points are sums of the weight coefficients multiplied by the number of times the contents were reproduced and the hours for which the contents were reproduced; (d) a group that has a lot of numerical values, where the numerical values are sums of the above points multiplied by content coefficients that are assigned to each content type (image, video, and audio), respectively. Note that the first output control unit 1400 may measure the number of reproduction times or the reproduction hours when it outputs contents to the display device 1700. In this measurement, the number reproduction times may be measured by regarding a reproduction over a predetermined standard time as one reproduction, and the measurement of the reproduction hours may be started when a reproduction is started. Also, the number of reproduction times and the reproduction hours may be stored in the storage unit 1100.

(3) In the above Embodiments 1 and 2, the description is made on the presumption that there is one user. However, there are cases where the device is used by a plurality of users. In that case, the storage unit 1100 may store history information of the number reproduction times, the reproduction hours and the like for each user.

Furthermore, when there are a plurality of users, each user may be urged to input the user name when the user starts to use the device so that each user can be identified. This makes it possible to record history information of the number reproduction times, the reproduction hours and the like for each user, and propose recommended contents for each user.

(4) In the above description, the second output control unit 2600 calculates user preference levels by assigning values of the creation date/time attribute or the location attribute of the user-selected image to the user preference functions. However, not limited to this, values of the creation date/time attribute or the location attribute of the recommended images may be assigned to the functions. This makes it possible to obtain the user preference level as of when the related images that the user appeared to give preference were created. Also, the current date/time to be displayed on the display device 1700 may be assigned to the user preference functions. This makes it possible to obtain the user preference level as of the date/time that is to be displayed on the display device 1700.

Furthermore, in the above description, the user preference function is determined by treating the values of the attribute as samples that follow a normal distribution. However, not limited to this, distributions other than the normal distribution may be used. Also, a frequency distribution, in which the number of images, the number of reproduction times, the reproduction hours, a combination of these or the like is used, may be determined as the user preference function.

(5) In the above Embodiments 1 and 2, the user preference identifying unit 1200 does not perform weighting when it counts the number of images belonging to each user high preference group. However, taking account that the user's preference may change over time, a larger weight coefficient may be assigned to a more recently created image than to a less recently created image when the number of images is counted.

(6) In the above Embodiments 1 and 2, as the keyword attributes stored in the storage unit 1100, one keyword per image is stored. However, not limited to this, a plurality of keywords per image may be stored. In that case, the user preference identifying unit 1200 may divide the image into groups by each of the plurality of keywords.

(7) In the above Embodiments 1 and 2, the user preference identifying unit 1200 identifies the groups with keywords "sweets" and "trip" as user high preference groups since each of the groups has three images as shown in FIG. 8, and the second output control unit treats these groups equally. However, if there is a difference in the number of images of a keyword between user high preference groups, for example, one group has six images of "sweets" and another has three images of "trip", the relative images included in the group with six images of "sweets" may be more highlighted than the group with three images of "trip" by, for example, placing the group with six images of "sweets" before the group with three images of "trip" in display order.

(8) In the above Embodiments 1 and 2, the user preference identifying unit 1200 has a predetermined reference value in advance. However, the user high preference groups may be determined as follows. That is to say, after images are divided into groups by keyword, a group that has the largest number of images may be regarded as a user high preference group, or a plurality of groups that have the largest numbers of images may be regarded as user high preference groups.

(9) In the above embodiments, the keyword attribute is preliminarily determined as an attribute that is used by the user preference identifying unit 1200. However, not limited to this, any attribute may be preliminarily determined for this purpose. Also, the information indicating the preliminarily determined attribute may be built in the image display device, or may be selected by the user, with an attribute list screen being presented to the user before step S701 shown in FIG. 7.

Also, according to the above description, the predetermined attributes used by the related content identifying unit 1500 are attributes "creation date/time", "creator's name", and "location". However, the number of attributes is not limited to three, and any attributes may be used for this purpose. Also, the information indicating the preliminarily determined attribute may be built in the image display device, or may be selected by the user, with an attribute list screen being presented to the user before step S401 shown in FIG. 4.

(10) In the above description, in the grouping process performed in step S701 of FIG. 7, the user preference identifying unit 1200 divides the images into groups which are each composed of images having the same attribute. However, when the attributes are represented by texts (character information), the images may be divided into groups which are each composed of images having similar attributes, not the same attribute, by using, for example, a dictionary of synonyms stored in the storage unit 1100. Also, when the attributes are represented by numerical values such as dates/times or latitudes and longitudes, the images may be divided into groups which are each composed of images whose values of attributes differ from each other by a difference value which is within a predetermined range. Furthermore, when the attributes are represented by texts, the related content identifying unit 1500 may also regard images as related images if they have similar attributes, not the same attribute, by making a judgment with use of, for example, a dictionary of synonyms stored in the storage unit 1100.

(11) In the above description, the list shown in FIG. 5 is used for the sake of explanation. However, as far as the user preference identifying unit 1200 can refer to attributes of all contents to divide images into groups by a predetermined attribute, the list shown in FIG. 5 may not be generated, and the user preference identifying unit 1200 may refer to the images stored in the storage unit 1100 one by one to refer to each attribute.

(12) The method for determining the predetermined reference value that is used by the user preference identifying unit 1200 in step S702 of FIG. 7 is not limited, but the predetermined reference value may be preliminarily set in the image display device, or may be set by the user, for example. When the user sets the predetermined reference value, a screen may be displayed before step S701 of FIG. 7 to urge the user to determine the value, by selecting a number from among a plurality of numbers for options, for example.

Also, the reference value, which is used by the related content identifying unit 1500 to identify related images in step S403 or S405 of FIG. 4, may be preliminarily set in the image display device, or may be set by the user. When the user sets the reference value, a screen may be displayed before step S401 of FIG. 4 to urge the user to determine the value, by selecting a number from among a plurality of numbers for options, for example.

Figure 15:
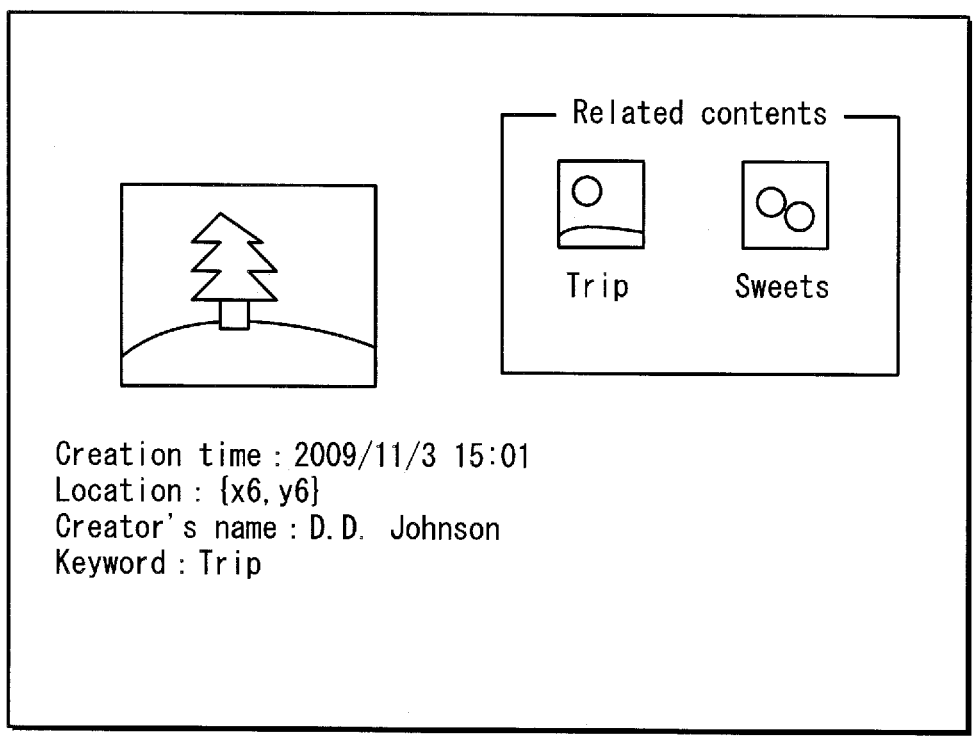
FIG. 15 illustrates another example of output results by the image display device 2000.

(13) As shown in FIG. 9, areas are provided on the screen so that the second output control unit 1600 can display related images for each attribute. However, not limited to this, icons indicating images that are both related images and user high preference images (in the present example, the images with content IDs "2" and "1") may be displayed on the screen as shown in FIG. 15, without identifying the attributes in which the images are related to the user-selected image.

Figure 16:
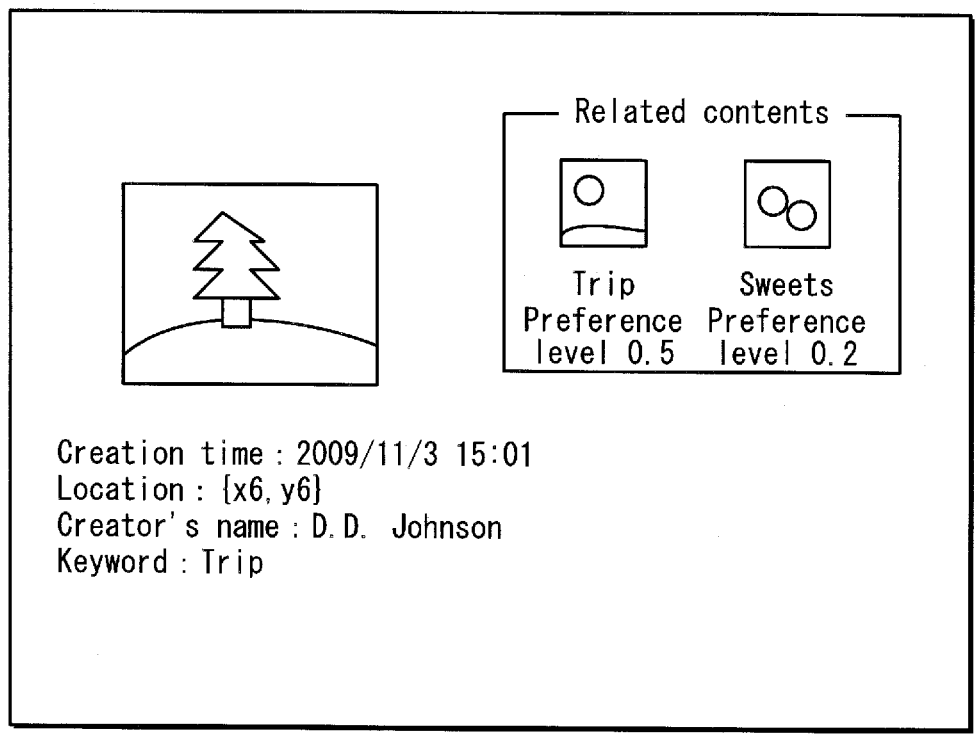
FIG. 16 illustrates another example of output results by the image display device 2000.

(14) As shown in FIG. 14, areas are provided on the screen so that the second output control unit 2600 can display, for each attribute, an image that is both a related image and a user high preference image. However, not limited to this, such images may be displayed on the screen as shown in FIG. 16, without identifying the attributes. However, for example, in a user high preference group of "sweets", the "creation date/time" attribute and the "location" attribute of an image may be different from each other in user preference level. In that case, the maximum value of the user preference level can be used.

(15) In the above description, the user preference identifying unit 1200 divides contents into groups by a predetermined attribute. However, two or more attributes may be selected from a plurality of attributes of the contents, the contents then may be divided into groups by each of the two or more attributes, and from among all the groups of contents, one or more groups having high preference levels of the user may be identified. The following explains an example where not only the "keyword" attribute but the "creation date/time" attribute is considered in the user preference identifying process. The description is made with reference to FIG. 5 by using the images with content IDs "1" through "10". When the contents are divided into groups by the "creator's name" attribute, four images with content IDs "1", "3", "5" and "6" belong to the group of "A. A. Rose". Similarly, two images with IDs "4" and "7" belong to the group of "BB band", and one image with ID "8" belongs to the group of "D. D. Johnson". In the representation of the elements of the table, the sign "-" indicates that there is no attribute, and the element with the sign "-" is excluded from the targets of the user preference identifying process. In the example of FIG. 8, which shows results of grouping by the "keyword" attribute, the reference value has been set to "3", and thus groups having three or more contents of the attribute are regarded as user high preference groups. As a result, the group of "A. A. Rose" is also regarded as a user high preference group and is added to the user high preference groups shown in FIG. 8, resulting in the user high preference groups having contents with content IDs "1", "2", "3", "5", "6", "7", "8", "9" and "10". As an alternative to the above example, only a group of "A. A. Rose", which has the largest number of contents, may be regarded as the user high preference group, and images with content IDs "1", "3", "5" and "6" may be regarded as user high preference images.

(16) In the above description, images are stored in the storage unit 1100. However, not limited to this, images may be stored in an external storage unit. In this case, among the elements of the data structure shown in FIG. 2, at least the element "file path" (indicating an address of an image stored in the external storage unit) needs to be stored in the internal storage unit 1100.

(17) In Embodiments 3 and 4, images (still images) are stored in the storage unit 3100, and attributes of the images are used to retrieve images. However, instead of the images (still images), video or audio contents may be stored in the storage unit, and attributes of the contents may be used to retrieve contents. In that case, instead of "image", "video" or "audio" may be recorded in the "type" in the data shown in FIG. 18.

In the case of video, if a video display request is received in step S2208 of FIG. 22 and a plurality of videos are to be displayed, representative scenes of the videos may be provided as thumbnail images, or the videos may be reproduced in a reduced size without audio.

In the case where audios are presented, if an audio presentation request is received in step S2208 of FIG. 22 and a plurality of audios are to be presented, an icon such as a facial photo of the creator or a musical note sign may be displayed for each audio, together with the creation date/time attribute of the audio.

Furthermore, the storage unit 3100 may store variable formats of data such as images, videos, and audios.

(18) In Embodiments 3 and 4, the grayscale level of an image was expressed by reducing the information of the image. However, not limited to this, the grayscale level may be expressed by other methods.

For example, the a blending may be performed by turning the background image into an image with a single color of white. The α blending is a method in which the pixel value of an original image is denoted as "Value0", the pixel value of the background image is denoted as "Value1", a coefficient is denoted as α (α is a value ranging from 0 to 1), and the pixel value "Value" of a new image that is resulted from the α blending is obtained from equation "Value=Value0×(1−α)+Value1×α". In this method, it is possible to change the color of the image to be closer to the color of the background image by setting the coefficient α to a value closer to 1. Accordingly, when the background image is a single color of white, the whole image becomes white gradually. The value of α may be changed to express the grayscale level of the image. Also, the α blending may be performed by turning the background image into an image with a single color of gray, or by using a background image displayed when the image display device displays results. As another method, it is possible to turn the whole image into gray by gradually changing the value of RGB for each pixel of the image to an intermediate value. As a further method, the whole image may be gradually changed in a mosaic-like manner.

(19) In Embodiments 3 and 4, a slide bar is displayed so that the user can input weight coefficients for each attribute by using the slide bar. However, instead of the slide bar, a pulldown menu may be displayed so that the user can select a value, or an area may be provided on the screen so that the user can directly input the weight coefficients from the area.

Alternatively, the slide bar may not be displayed. In this case, values of the weight coefficients may be preliminarily set by the user, or may be provided by the designer of the image display device.

(20) In Embodiment 3, the arrangement determining unit 3400 adopts a display arrangement using a creation date/time attribute, and in Embodiment 4, the arrangement determining unit 4400 adopts a display arrangement using another creation date/time attribute. However, not limited to these, display arrangements using other attributes, such as the location attribute and the facial information attribute, may be adopted.

Figure 35:
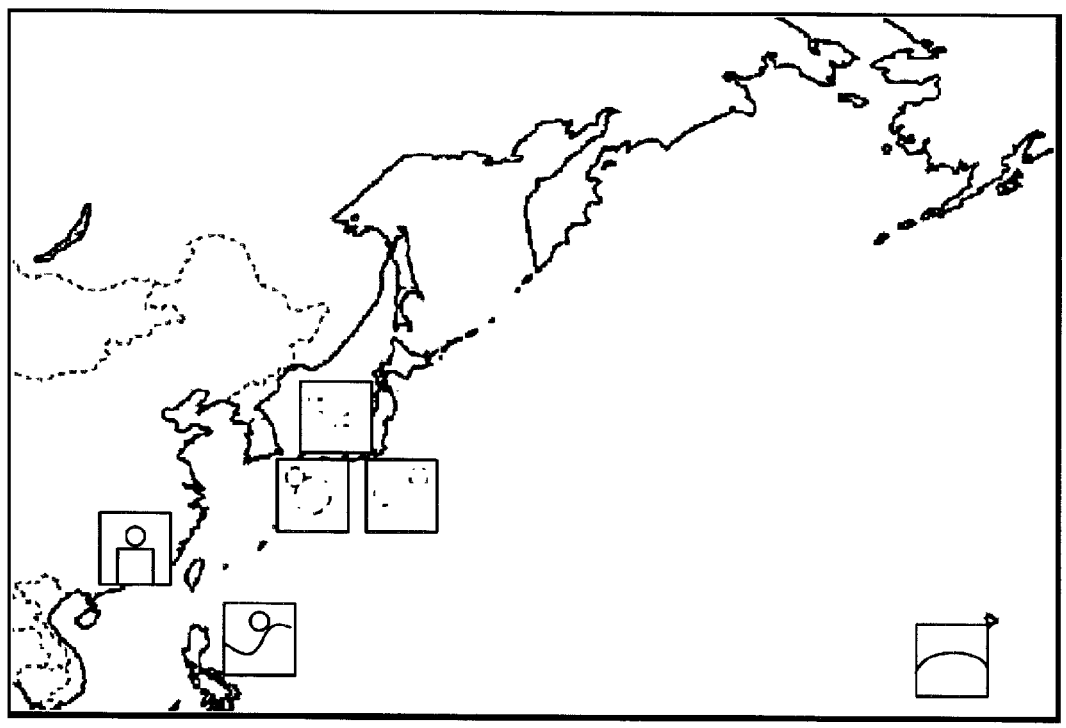
FIG. 35 illustrates an example of output results by an image display device.

In the case of using the location attribute, a display arrangement in which images are displayed on a map at positions indicated by the location attributes, as shown in FIG. 35, may be adopted. In the example shown in FIG. 35, as in Embodiment 3, the display form classification unit 3500 displays images of the same size, representing the importance levels by grayscale levels of the images, and the attribute information evaluation unit evaluates the attributes in the same manner as in Embodiment 3, with weight coefficient "1" assigned to the location attribute, and weight coefficient "0" assigned to the other attributes. With this arrangement, the less frequently visited the locations are, the denser the images displayed at the locations are.

Figure 36:
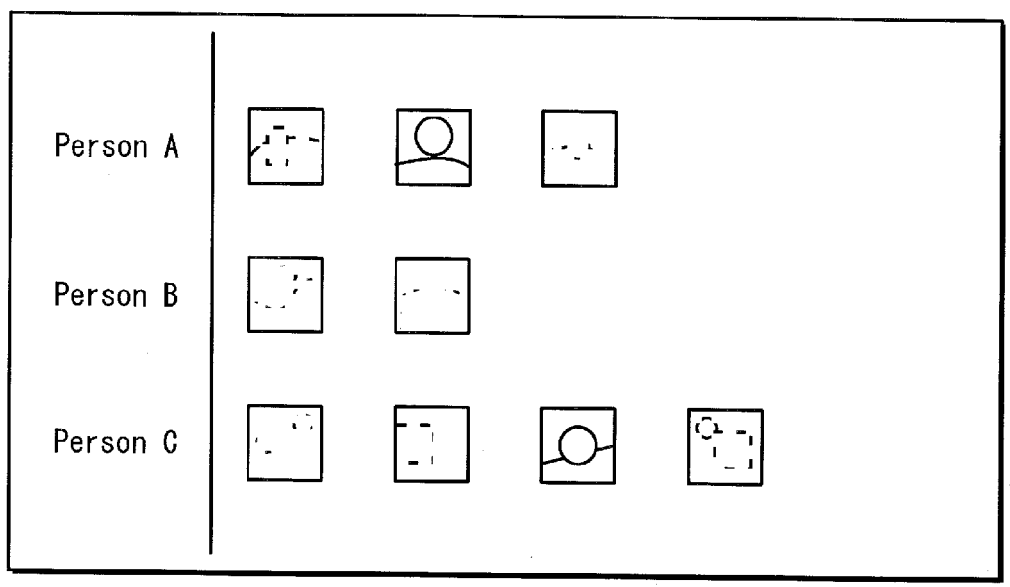
FIG. 36 illustrates an example of output results by an image display device.

In the case of using the facial information attribute, a display arrangement in which images are displayed on the side of persons' names, as shown in FIG. 36, may be adopted. In the example shown in FIG. 36, as in Embodiment 3, the display form classification unit 3500 displays images of the same size, representing the importance levels by grayscale levels of the images, and the attribute information evaluation unit evaluates the attributes in the same manner as in Embodiment 3, with weight coefficient "1" assigned to the facial information attribute, and weight coefficient "0" assigned to the other attributes. With this arrangement, the less frequently photographed in less number of people the persons are, the denser the displayed images of the persons are.

Figure 37:
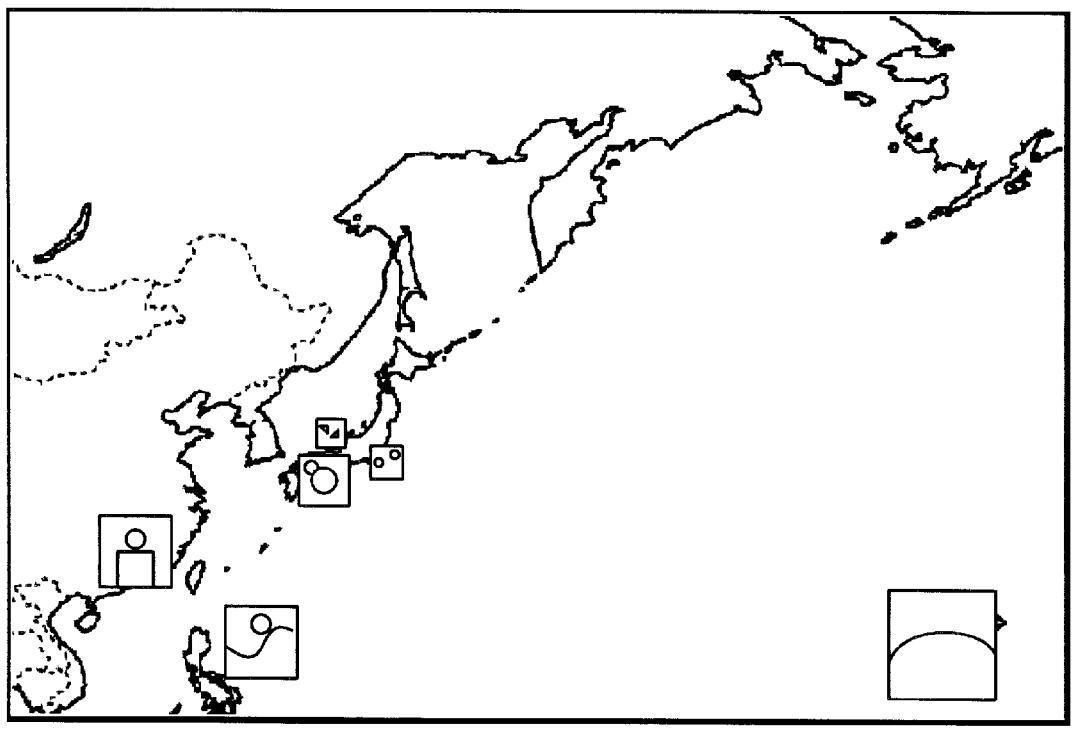
FIG. 37 illustrates an example of output results by an image display device.

(21) In the above description, as the display form, the display form classification unit 3500 displays images of the same size, for example, vertical 60 pixels×horizontal 60 pixels, and represents the importance levels by grayscale levels of the images. However, not limited to this, images of the same grayscale level may be displayed, and the importance levels may be represented by the size of the images. In this case, the images are displayed as shown in FIG. 37. In the example of FIG. 37, as in Embodiment 3, the attribute information evaluation unit evaluates the attributes, and a display arrangement based on the location attribute is adopted, with weight coefficient "1" assigned to the location attribute, and weight coefficient "0" assigned to the other attributes. With this arrangement, the less frequently visited the locations are, the larger the images displayed at the locations are. Also, when the reduced images have the same size, the size is not limited to vertical 60 pixels×horizontal 60 pixels. Note that, if an input image is smaller than the specified size, the input image is enlarged instead of being reduced.

Figure 38:
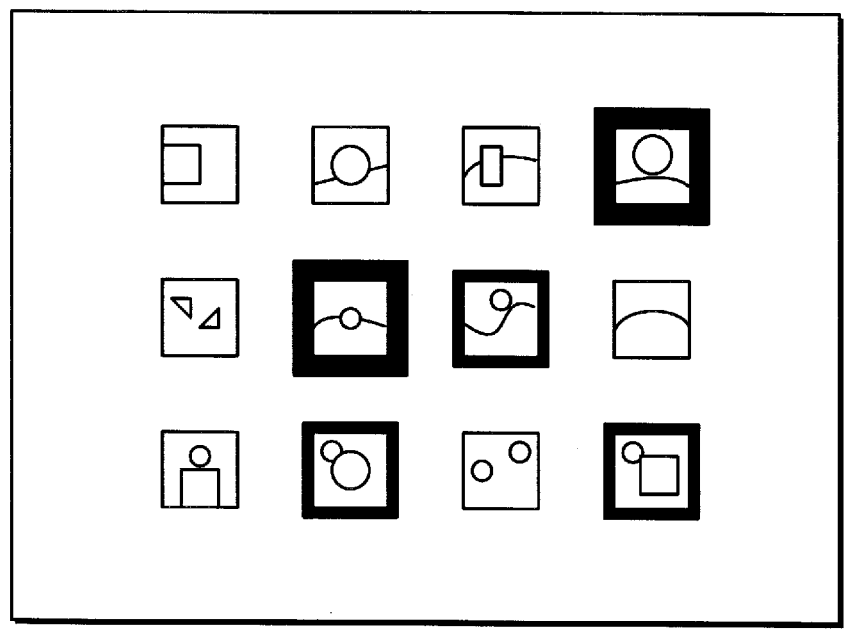
FIG. 38 illustrates an example of output results by an image display device.

Also, as the display form, images of the same size and grayscale level may be displayed, and the importance levels may be represented by the thickness of the frame lines encircling the images. In this case, the images are displayed as shown in FIG. 38. In the example of FIG. 38, as in Embodiment 3, the attribute information evaluation unit evaluates the attributes, and a display arrangement based on the creation date/time attribute of Embodiment 4 is adopted, with weight coefficient "1" assigned to the creation date/time attribute, and weight coefficient "0" assigned to the other attributes. Accordingly, the closer to a life event in time the image is, the thicker the displayed frame line of the image is.

Figure 39:
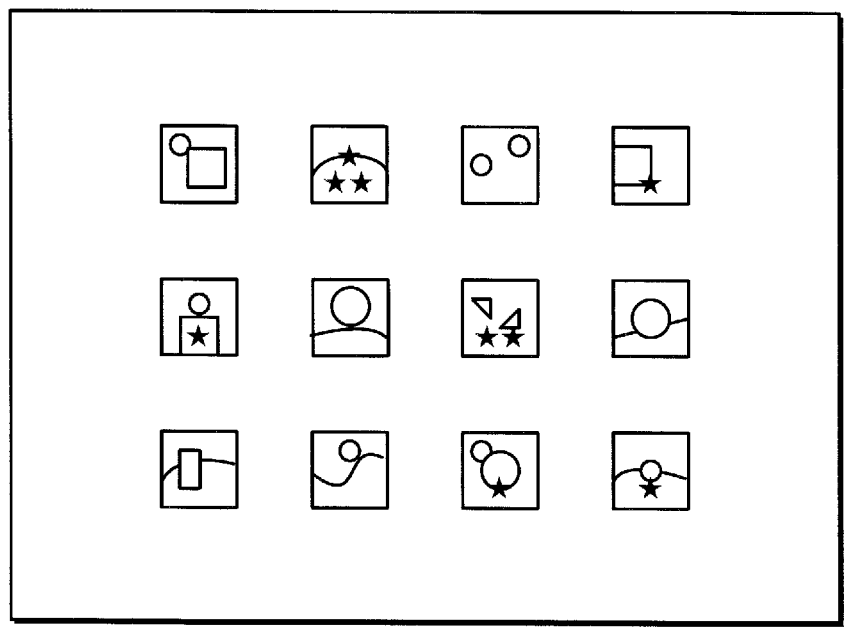
FIG. 39 illustrates an example of output results by an image display device.

Also, as the display form, images of the same size and grayscale level may be displayed, and the importance levels may be represented by the number of marks attached to the images. In this case, the images are displayed as shown in FIG. 39. In the example of FIG. 39, as in Embodiment 3, the attribute information evaluation unit evaluates the attributes, and a display arrangement based on the creation date/time attribute of Embodiment 4 is adopted, with weight coefficient "1" assigned to the creation date/time attribute, and weight coefficient "0" assigned to the other attributes. Also, the importance level of each image is represented by the number of start marks attached to the image, namely, zero, one, two, or three. As a result, the closer to a life event in time the image is, the larger the number of star marks attached to the image is.

Furthermore, in a three-dimensional UI, as the display form, images of the same size and grayscale level may be displayed, and the images may be arranged on an axis in a direction perpendicular to the reference plane. With this display form, when looking from above, images in front of the screen look larger, and images behind the screen look smaller and blurred. Also, it is possible to use a three-dimensional UI to represent the importance levels of the images such that the smaller the importance level of the image is, the more slanted the image is, and the larger the importance level of the image is, the closer to the vertical position the image is.

(22) In Embodiment 3, the attribute information evaluation unit 3200 calculates the importance level for each attribute by using the life event information, frequently-appearing-location information, or frequently-appearing-person information input by the user. However, not limited to this, the calculation of the importance level for each attribute may be performed without using information input the user. For example, in the case of the creation date/time attribute, if there was a day in which 50 images were photographed while normally, approximately five images are photographed per day, the day can be regarded as a special day, not a normal day, and a high importance level can be assigned to the day. Also, in the case of the location attribute, if it is detected from the information of the latitude and longitude that images were photographed at a location that is distant from a predetermined location where images are often photographed, the location can be regarded as a special location, not a normal location, and a high importance level can be assigned to the location. Also, in the case of the facial information attribute, the less frequently photographed a person is among persons taken in pictures, the more special regarded as the person is, and the higher the assigned importance level is.

(23) In Embodiment 3, the attribute information evaluation process is performed as indicated in FIG. 23. However, (i) the process of steps S2301 through S2303, (ii) the process of steps S2304 through S2306, and (iii) the process of steps S2307 through S2308 may not necessarily be calculated in the order indicated in FIG. 23, but may be calculated in other orders. For example, the processes may be executed in the order of (ii), (i) and (iii).

Also, in Embodiment 4, the attribute information evaluation process is performed as indicated in FIG. 33. However, (iv) the process of steps S1301 through S1303, (v) the process of steps S1304 through S1306, and (vi) the process of steps S1307 through S1308 may not necessarily be calculated in the order indicated in FIG. 33, but may be calculated in other orders. For example, the processes may be executed in the order of (vi), (v) and (iv).

(24) In the above embodiments, the importance components are calculated for each attribute. However, the calculation of the importance components and the normalization may be performed by methods other than the ones described above. Also, the user may be given the right to change the values of the importance components after the values are calculated for each attribute. The user may further be given the right to freely determine the range and size of the values of weight coefficients.

(25) In Embodiment 3, the attribute information evaluation unit 3200 judges as more important an image in which a less number of persons are photographed. However, not limited to this, an image such as a group photograph in which a large number of persons (for example, a family and relatives) are photographed may be judged as important. In this case, it may be judged based on the size of the faces included in the image whether the image is a crowd photograph or a group photograph.

(26) The display form classification unit 3500 may pick up an attribute having the highest importance level from among importance levels for each attribute, and may determine the grayscale levels in display in accordance with only the picked-up attribute. Furthermore, a threshold value may be determined for each attribute, and if there is an attribute whose importance level is higher than the threshold value, the attribute may be picked up, and the grayscale levels in display may be determined in accordance with only the picked-up attribute.

(27) In the above description, the display form classification unit 3500 classifies the images into a group in which the importance level belongs to a range from 0 to ⅓ of the sum of the values of weights, a group in which the importance level belongs to a range from ⅓ to ⅔ of the sum of the values of weights, and a group in which the importance level belongs to a range from ⅔ of the sum of the values of weights to 3/3 of the sum of the values of weights. However, not limited to this, the images may be classified into a group in which the importance level belongs to a range from 0 to ⅓ of the largest value of weight, a group in which the importance level belongs to a range from ⅓ to ⅔ of the largest value of weight, and a group in which the importance level belongs to a range from ⅔ of the largest value of weight to 3/3 of the largest value of weight. The range of each group may not necessarily be equal, but may be determined freely. Furthermore, an importance level frequency distribution may be generated, and the images may be classified into groups by display form based on the frequency distribution.

(28) Ages of the persons in images may be calculated by using the facial information of the images, and a higher importance level may be assigned to an image having a larger number of persons who are of the same age. For example, if the user selects an image of infants, not only the infants of the selected image but other infants of other images may be taken into account when the importance level of the image is determined.

(29) The user operation receiving units 3300 and 4300 have a mouse or the like to receive operations from the user. However, they may have a typical pointing device or the like and a keyboard or the like. In this case, a single click by the mouse is realized by a specification of coordinates by the pointing device, and a double click by the mouse is realized by a simultaneous inputs of a specification of coordinates and the Enter key of the keyboard.

(30) Typically, the image display devices recited in Embodiments 1-4 are realized as LSIs that are semiconductor integrated circuits. The LSIs may be each realized on one chip, or part or all thereof may be realized on one chip. Although the term LSI is used here, it may be called IC, system LSI, super LSI, ultra LSI or the like, depending on the level of integration.

The method for realizing the integrated circuits is not limited to the LSI, but the integrated circuits may be realized by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

Furthermore, it is possible to structure rendering devices for various purposes by combining a semiconductor chip on which the image display device of Embodiments 1 and 2 is integrated, with a display for rendering images. The image output device can be used as an information rendering unit in a mobile phone, television, digital video recorder, digital video camera, car navigation or the like. It can be combined with a display such as a Cathode Ray Tube (CRT), as well as a flat display such as a liquid crystal display, PDP (Plasma Display Panel), or organic EL, or a projection-type display represented by a projector.

(31) It is also possible to record, onto a recording medium, a control program composed of program codes for causing a processor and various circuits connected with the processor to execute the user preference identifying process (see FIGS. 3, 4, 7, 11 or the like), the process concerning image displays (see FIGS. 22, 23, 24, 26, 30, 31, 33 or the like) or the like described in Embodiments 1-4 above, or to distribute it via any of various types of communication paths. The above recording medium includes an IC card, hard disk, optical disc, flexible disc, ROM or the like. The distributed control program may be stored in a memory or the like that can be read by the processor, so as to be available for use, and as the processor executes the control program, the various functions described in the embodiments above are realized.

(32) The following further describes the structure of a content output device in one embodiment of the present invention, and variations and effects thereof.

(a) The content output device in one embodiment of the present invention includes: a storage unit storing a plurality of contents, each being associated with an attribute thereof; a first output control unit operable to output a content among the contents stored in the storage unit; a related content identifying unit operable to identify, among the contents stored in the storage unit, contents whose attributes are related to an attribute of the content output by the first output control unit; a user preference identifying unit operable to classify the contents stored in the storage unit into a plurality of groups by attribute, calculate an amount of contents for each group, detect one or more groups each including contents an amount of which exceeds a predetermined amount, and identify contents that are included in the detected groups; and a second output control unit operable to output one or more contents that belong to both a set of related contents identified by the related content identifying unit and a set of contents identified by the user preference identifying unit.

With this structure, the content output device can display to the user, with regard to a content displayed to the user, contents which, among a plurality of contents stored in the storage unit by the user, have attributes that match the user's preference and are related to attributes of the displayed content.

(b) In the above content output device, the storage unit may store information regarding the substantial content, as an attribute of the contents, and the user preference identifying unit may classify the contents into a plurality of groups based on the information regarding the substantial content.

With this structure, it is possible to identify a preference of the user in accordance with the substantial content of the contents.

(c) In the above content output device, the contents may be images, the first output control unit may perform the output by displaying the content, the second output control unit may perform the output by displaying the one or more contents, the storage unit may store a plurality of attributes for each content, the attributes of the contents may include a character string representing a substantial content of a content, and the user preference identifying unit may classify the contents stored in the storage unit into groups by the character string representing the substantial content of the content.

This makes it possible to deal with images as contents, and, when identifying the user's preference, display the images as the contents that are in line with the substantial content of the contents and belong to a group having the largest number of contents.

(d) In the above content output device, the user preference identifying unit may calculate the amount of contents for each group as the number of contents belonging to each group.

This makes it possible to, after classifying the contents into groups, identify the user's preference based on the number of contents belonging to each of the groups.

(e) In the above content output device, the storage unit may store information regarding creations of the contents, as an attribute of the contents, and the related content identifying unit may identify the related contents based on the information regarding creations of the contents, without using the character string representing the substantial content of the content.

This makes it possible to obtain information regarding creations of the contents, as an attribute of the contents, and when identifying related contents, it is possible to identify the related contents by using the attribute that is the information regarding creations of the contents, without using a keyword that is the attribute used by the user preference identifying unit.

(f) In the above content output device, the information regarding creations of the contents may indicate a location at which a corresponding content was created, and the related content identifying unit may identify, from among the contents stored in the storage unit, one or more contents that were created at locations within a predetermined distance from a location of the content output by the first output control unit.

This enables the attributes to include locations at which the contents were created, and the related content identifying unit to identify, as the related contents, contents that were created at locations within the predetermined distance from the location of the content output by the first output control unit.

(g) The above content output device may further include a user operation receiving unit operable to receive an operation of the user, the content to be output by the first output control unit may be determined based on the user operation received by the user operation receiving unit, the storage unit may store information indicating creation dates/times of the contents as an attribute of the contents, and the second output control unit may calculate a preference level with regard to a creation date/time of the content to be output, based on a distribution of creation dates/times of the contents identified by the user preference identifying unit, and output the content in accordance with the preference level.

This makes it possible to (i) determine the content to be output by the first output control unit, based on a user operation, (ii) include creation dates/times of the contents as an attribute of the contents, (iii) determine a user preference function based on creation dates/times of the contents identified by the user preference identifying unit, when the user preference level is calculated, (iv) calculate the user preference level based on a creation date/time of the content that is determined based on a user operation and is to be output by the first output control unit, and (v) output the content in accordance with the preference level.

(h) In the above content output device, the attributes of the contents may include information indicating creation dates/times of the contents, and the second output control unit may calculate a preference level with regard to a time at which the second output control unit is to output the content, based on a distribution of creation dates/times of the contents identified by the user preference identifying unit and on time at which the second output control unit is to output the content, and output the content in accordance with the preference level.

This makes it possible for the attributes of the contents to include creation dates/times of the contents, making it possible to determine a user preference function based on creation dates/times of the contents identified by the user preference identifying unit, when the user preference level is calculated, calculate the preference level with regard to a time at which the second output control unit is to output the content, and output the content in accordance with the preference level.

(i) In the above content output device, the attributes of the contents may include character strings representing substantial contents of the contents, the storage unit may store a table associating character strings, which are related to each other in meaning, with each other, and based on the table, the related content identifying unit may identify, among the contents stored in the storage unit, contents that are related to, in meaning, a character string representing the substantial content of the content output by the first output control unit.

This makes it possible to use keywords as the attributes of the contents, and the related content identifying unit can identify related contents by using the table associating keywords which are related to each other in meaning.

(j) The above content output device may further include a user operation receiving unit operable to receive user operations, the first output control unit may count the number of times contents are output, based on the user operations received by the user operation receiving unit, the storage unit may store, as an attribute of the contents, information indicating the number of outputs counted for each content output by the first output control unit, the amount of contents belonging to each group calculated by the user preference identifying unit may be the number of times the contents belonging to each group are output, and the amount may be calculated by adding up the number of times the contents belonging to each group are output.

This makes it possible for the first output control unit to count the number of times contents are output, based on the user operations received by the user operation receiving unit. Also, the storage unit stores the number of outputs counted each time a content is output. With this structure, it is possible to identify, when identifying a preference of the user, contents that are in line with the substantial content of the contents and belong to a group having the largest number of outputs by the user.

(k) In the above content output device, the storage unit may store information indicating locations at which the contents were created, as the attributes of the contents, and the user preference identifying unit may classify the contents into a plurality of groups by the distance between a predetermined location and locations at which the contents were created.

This makes it possible to identify a preference of the user based on the locations at which the contents were created.

(33) The following further describes the structure of a content output device in one embodiment of the present invention, and variations and effects thereof.

(a) The content output device in one embodiment of the present invention includes: a storage unit storing a plurality of contents, each being associated with an attribute thereof; an arrangement determining unit operable to determine, based on a predetermined standard, a display arrangement for each of the plurality of contents to be displayed and stored in the storage unit, a display form classification unit operable to calculate an importance level of each content based on the attributes of each content to be displayed, and determine a display form of each content based on the importance level; and a display control unit operable to display a plurality of contents in the determined display form, in accordance with the display arrangement.

With this structure, the content output device can display a plurality of contents among the contents stored in the storage unit by the user, on a display in accordance with a predetermined display arrangement and a display form determined based on the importance level that is based on the attributes of each content.

(b) In the above content output device, the attributes of the contents may include times at which the contents were created, the storage unit may store times of events of the user, and the display form classification unit may calculate the importance level of each content such that the smaller the difference between a time at which a content was created and a time of an event of the user is, the higher the importance level is.

This makes it possible for the attributes of the contents to include times at which the contents were created, making it possible to determine how a content is important based on such a standard that the smaller the difference between a time at which the content was created and a time of an event of the user is, the larger the importance of the content is.

(c) In the above content output device, the contents may be images, and the display form classification unit may reduce pixels from each content in accordance with the importance level of each content.

This makes it possible to deal with images as the contents, facilitating the user to find contents reflecting levels of interest of the user, by highlighting the contents that are highly interesting to the user.

(d) In the above content output device, the storage unit may store a plurality of attribute for each content, and the display form classification unit may calculate, for each attribute, may calculate the importance level of each content by calculating, for each attribute, importance components constituting the importance level, assigning weights to the importance components for each attribute, and adding up the weights.

This makes it possible for each content to have a plurality of attributes, making it possible to calculate the importancel components constituting the importance level that is used to determine the display form for each attribute, and calculate the importance level of each content by assigning weights to the importance components and adding up the weights.

(e) The above content output device may further include a user operation receiving unit operable to receive inputs of the weights.

This makes it possible for the user to determine and input the weight for each attribute.

(f) In the above content output device, the predetermined standard based on which the arrangement determining unit determines the display arrangement for each content may be an arrangement of contents to be displayed, arranged in an order of creation times indicated as an attribute of the contents.

This makes it possible to arrange the contents in the order of times at which the contents were created.

(g) In the above content output device, the contents may be images, and the display control unit may display the contents in different sizes that correspond to different importance levels.

This makes it possible to deal with images as the contents, varying the display size of the images in accordance with the importance levels of the images.

(h) In the above content output device, the attributes of the contents may include locations at which the contents were created, the storage unit may store a predetermined location, and the display form classification unit may calculate the importance level of each content such that the smaller the difference between a location at which a content was created and the predetermined location is, the higher the importance level is.

This makes it possible to use, as the attributes of the contents, the locations at which the contents were created, and calculate the importance level of each content such that the smaller the difference between a location at which a content was created and the predetermined location determined by the user is, the higher the importance level of the content is.

(i) The above content output device may further include a facial information generating unit operable to generate facial information of persons in the contents based on the contents, and store the facial information in the storage unit as one of the attributes, the contents may be images, and the display form classification unit may calculate the importance level of each content based on the number of persons, among the persons in the contents, that do not match predetermined persons.

This makes it possible to deal with images as the contents, generate facial information for each person who is in the images, and determine the importance level of each image based on the number of persons, among the persons in the images, who are not predetermined persons set by the user.

(j) The above content output device may further include a user operation receiving unit operable to receive a selection of a content from among the displayed contents, and the display form classification unit may calculate the importance level of each content such that the more similar to an attribute of the selected content the attribute of the content is, the higher the importance level is.

This makes it possible to determine the importance level of each content such that the more similar to an attribute of the selected content the attribute of the content is, the higher the importance level is.

(k) In the above content output device, the display control unit may display the contents in a same display form before a user operation is received.

With this structure, when the user is to select a content for the first time, all the displayed contents appear to be the same to the user. This facilitates the user to select a content.

INDUSTRIAL APPLICABILITY

The content output device of the present invention can be used for various purposes. For example, it is useful as a battery-driven mobile display terminal such as a mobile phone, mobile music player, digital camera, or digital video camera. The content output device is also useful as information display means as a menu display, Web browser, editor, EPG, or map display in a high-resolution information display device such as a television, digital video recorder, or car navigation.

REFERENCE SIGNS LIST 1000, 2000, 3000, 4000 image display device
1100, 3100 storage unit
1200 user preference identifying unit
1300, 3300, 4300 user operation receiving unit
1400 first output control unit
1500 related content identifying unit
1600, 2600 second output control unit
1700, 3700 display device
2610 user preference function generating unit
3200, 4200 attribute information evaluation unit
3400, 4400 arrangement determining unit
3500 display form classification unit
3600 display control unit

The invention claimed is:

1. A content output device comprising:
a storage unit storing a plurality of contents, each of the plurality of contents being associated with an attribute thereof;
a first output control unit operable to output a predetermined content among the plurality of contents stored in the storage unit to a screen;
a related content identifying unit operable to identify, among the plurality of contents stored in the storage unit, a set of related contents whose attributes are related to an attribute of the predetermined content;
a user preference identifying unit operable to classify the plurality of contents stored in the storage unit into a plurality of groups by attribute, calculate the number of contents belonging to each group, detect one or more groups that have the number of contents which exceeds a predetermined number, and identify a set of high-preference contents which are the contents included in the detected groups;
a second output control unit operable to output, to the screen, one or more contents that belong to both the set of related contents and the set of high-preference contents; and
a user preference function generating unit operable to generate a user preference function that is used to calculate a user preference level of each content belonging to the set of high-preference contents,
wherein the second output control unit calculates the user preference level of each content belonging to the set of high-preference contents by using the user preference function, processes the one or more contents so that the one or more contents are to be highlighted according to different levels in correspondence with the calculated user preference levels, and then outputs the one or more contents to the screen.

2. The content output device of claim 1, wherein
when values of an attribute, which is common to all contents belonging to the set of high-preference contents, are represented by numerical values, the user preference function generating unit plots, against the attribute represented by a horizontal axis, the values of the attribute of the contents belonging to the set of high-preference contents, and calculates a probability density function of a normal distribution by treating the plotted values of the attribute as samples.

3. A content output method for outputting contents to be displayed to users, the content output method comprising:
a first output control step of outputting, to a screen, a predetermined content among a plurality of contents stored in a storage unit, each of the plurality of contents being associated with an attribute thereof;
a related content identifying step of identifying, among the plurality of contents stored in the storage unit, a set of related contents whose attributes are related to an attribute of the predetermined content;
a user preference identifying step of classifying the plurality of contents stored in the storage unit into a plurality of groups by attribute, calculating the number of contents belonging to each group, detecting one or more groups that have the number of contents which exceeds a predetermined number, and identifying a set of high-preference contents which are the contents included in the detected groups;
a second output control step of outputting, to the screen, one or more contents that belong to both the set of related contents and the set of high-preference contents; and
a user preference function generating step of generating a user preference function that is used to calculate a user preference level of each content belonging to the set of high-preference contents,
wherein the second output control step includes calculating the user preference level of each content belonging to the set of high-preference contents by using the user preference function, processing the one or more contents so that the one or more contents are to be highlighted according to different levels in correspondence with the calculated user preference levels, and then outputting the one or more contents to the screen.

4. A non-transitory computer readable recording medium having stored thereon a program, described in a computer-readable format, for causing a computer to execute a processing method to output contents to be displayed to users, the processing method comprising:
a first output control step of outputting, to a screen, a predetermined content among a plurality of contents stored in a storage unit, each of the plurality of contents being associated with an attribute thereof;
a related content identifying step of identifying, among the plurality of contents stored in the storage unit, a set of related contents whose attributes are related to an attribute of the predetermined content;
a user preference identifying step of classifying the plurality of contents stored in the storage unit into a plurality of groups by attribute, calculating the number of contents belonging to each group, detecting one or more groups that have the number of contents which exceeds a predetermined number, and identifying a set of high-preference contents which are the contents included in the detected groups;
a second output control step of outputting, to the screen, one or more contents that belong to both the set of related contents and the set of high-preference contents; and
a user preference function generating step of generating a user preference function that is used to calculate a user preference level of each content belonging to the set of high-preference contents,
wherein the second output control step includes calculating the user preference level of each content belonging to the set of high-preference contents by using the user preference function, processing the one or more contents so that the one or more contents are to be highlighted according to different levels in correspondence with the calculated user preference levels, and then outputting the one or more contents to the screen.

5. A content output integrated circuit for outputting contents to be displayed to users, the content output integrated circuit comprising:

a first output control unit operable to output a predetermined content among the plurality of contents stored in the storage unit to a screen;

a related content identifying unit operable to identify, among the plurality of contents stored in the storage unit, a set of related contents whose attributes are related to an attribute of the predetermined content;

a user preference identifying unit operable to classify the plurality of contents stored in the storage unit into a plurality of groups by attribute, calculate the number of contents belonging to each group, detect one or more groups that have the number of contents which exceeds a predetermined number, and identify a set of high-preference contents which are the contents included in the detected groups;

a second output control unit operable to output, to the screen, one or more contents that belong to both the set of related contents and the set of high-preference contents; and a user preference function generating unit operable to generate a user preference function that is used to calculate a user preference level of each content belonging to the set of high-preference contents, wherein the second output control unit calculates the user preference level of each content belonging to the set of high-preference contents by using the user preference function, processes the one or more contents so that the one or more contents are to be highlighted according to different levels in correspondence with the calculated user preference levels, and then outputs the one or more contents to the screen.

6. The content output device of claim 1, further comprising a GUI operable to input a parameter used to recalculate the user preference level, wherein the second output control unit recalculates the user preference level of each content belonging to the set of high-preference contents by using the parameter, processes the one or more contents so that the one or more contents are to be highlighted according to different levels in correspondence with the recalculated user preference levels, and then outputs the one or more contents to the screen.

* * * * *